US010351733B2

(12) United States Patent
Hensel et al.

(10) Patent No.: US 10,351,733 B2
(45) Date of Patent: Jul. 16, 2019

(54) COMPOSITE PILLAR STRUCTURES

(71) Applicant: Leibniz-Institut für Neue Materialien gemeinnützige GmbH, Saarbrücken (DE)

(72) Inventors: René Hensel, Saarbrücken (DE); Sarah Fischer, Kleinblittersdorf (DE); Eduard Arzt, Saarbrücken (DE)

(73) Assignee: Leibniz-Institut fuer Neue Materialien gemeinnuetzige GmbH, Saarbruecken (DE)

( * ) Notice: Subject to any disclaimer, the term of this patent is extended or adjusted under 35 U.S.C. 154(b) by 0 days.

(21) Appl. No.: 15/555,568

(22) PCT Filed: Mar. 17, 2016

(86) PCT No.: PCT/EP2016/055894
§ 371 (c)(1),
(2) Date: Sep. 5, 2017

(87) PCT Pub. No.: WO2016/146792
PCT Pub. Date: Sep. 22, 2016

(65) Prior Publication Data
US 2018/0051187 A1 Feb. 22, 2018

(30) Foreign Application Priority Data

Mar. 17, 2015 (DE) .................. 10 2015 103 965

(51) Int. Cl.
*B32B 7/04* (2019.01)
*C09J 7/00* (2018.01)
*B29C 39/02* (2006.01)

(52) U.S. Cl.
CPC .............. *C09J 7/00* (2013.01); *B29C 39/025* (2013.01); *B32B 7/04* (2013.01); *C09J 2201/622* (2013.01); *C09J 2201/626* (2013.01); *C09J 2471/00* (2013.01); *C09J 2475/00* (2013.01); *C09J 2475/006* (2013.01); *C09J 2483/00* (2013.01); *C09J 2483/006* (2013.01)

(58) Field of Classification Search
CPC .... B29C 39/025; B32B 7/04; C09J 2201/622; C09J 2201/626; C09J 2471/00; C09J 2475/00; C09J 2475/006; C09J 2483/00; C09J 2483/006; C09J 7/00
See application file for complete search history.

(56) References Cited

U.S. PATENT DOCUMENTS

| | | |
|---|---|---|
| 6,491,851 B1 | 12/2002 | Keller et al. |
| 7,229,685 B2 | 6/2007 | Full et al. |
| 8,153,254 B2 | 4/2012 | Arzt et al. |
| 8,192,668 B2 | 6/2012 | Spatz et al. |
| 8,771,354 B2 | 7/2014 | Picha et al. |
| 9,140,697 B2 | 9/2015 | Tseng et al. |
| 9,624,101 B2 | 4/2017 | Mardilovich et al. |
| 10,005,103 B2 | 6/2018 | Artz et al. |
| 10,046,541 B2 | 8/2018 | Schneider et al. |
| 2006/0005362 A1 | 1/2006 | Arzt et al. |
| 2008/0280085 A1 | 11/2008 | Livne |
| 2009/0053472 A1 | 2/2009 | Spatz et al. |
| 2010/0080951 A1 | 4/2010 | Del Campo Bécares et al. |
| 2014/0329061 A1 | 11/2014 | Lu et al. |
| 2015/0274904 A1 | 10/2015 | Yamamoto et al. |
| 2018/0051187 A1 | 2/2018 | Hensel et al. |
| 2018/0223886 A1 | 8/2018 | Kroner et al. |

FOREIGN PATENT DOCUMENTS

| | | |
|---|---|---|
| DE | 102 23 234 B4 | 2/2005 |
| DE | 10 2006 050 365 A1 | 4/2008 |
| DE | 10 2009 046 756 A1 | 5/2010 |
| DE | 102010026490 A1 | 1/2012 |
| DE | 10 2012 100 933 A1 | 8/2012 |
| DE | 102012112965 A1 | 6/2014 |
| DE | 102014119470 A1 | 6/2016 |
| EP | 1 241 930 B1 | 12/2000 |
| WO | 03/099951 A2 | 12/2003 |
| WO | 2007/096082 A1 | 8/2007 |
| WO | 2007096082 A1 | 8/2007 |
| WO | 2009/053714 A1 | 4/2009 |
| WO | 2010108003 A2 | 9/2010 |
| WO | 2012054039 A1 | 4/2012 |
| WO | 2013063069 A1 | 5/2013 |
| WO | 2016146792 A1 | 9/2016 |
| WO | 2018019879 A1 | 2/2018 |

OTHER PUBLICATIONS

Hertz, WO 2007/096082 translation, Feb. 13, 2007.*
Notification of Transmittal of Copies of Translation of the International Preliminary Report on Patentability of PCT/EP2016/055894, dated Sep. 28, 2017.

(Continued)

*Primary Examiner* — Lawrence D Ferguson
(74) *Attorney, Agent, or Firm* — Cahn & Samuels, LLP

(57) ABSTRACT

Composite pillar structures, in particular for adhesion to soft and rough surfaces, include in the longitudinal direction at least one region with lower elasticity modulus and at least one region with higher elasticity modulus. The region with lower elasticity modulus preferably includes an end face, wherein the two regions adjoin one another.

16 Claims, 19 Drawing Sheets

(56) References Cited

OTHER PUBLICATIONS

Khaderi et al., "Detachment of an adhered micropillar from a dissimilar substrate", Journal of the Mechanics and Physics of Solids, 75 (2015) 159-183.
Kroner et al., "Note: An adhesion measurement setup for bioinspired fibrillar surface using flat probes", Review of Scientific Instruments 83, 016101-1 to 016101-3 (2012).
Akisanya et al., "Interfacial Cracking from the Free-Edge of a Long Bi-Material Strip", Int. J. Solids Structures, vol. 34, No. 13, 1645-1665, 1997.
Bae et al., "Enhanced Skin Adhesive Patch with Modulus-Tunable Composite Micropillars", Adv. Healthcare Mater., 2013, 109-113.
International Search Report, PCT/EP2016/055894, dated Jun. 9, 2016.
English Abstract of DE 10 2006 050 365 A1.
English Abstract of DE 102 23 234 A1.
English Abstract of DE 10 2012 100 933 A1.
English Abstract of WO 2007/096082 A1.
English Abstract of DE 10 2009 046 756 A1.
English Abstract of WO 03/099951 A2.
English abstract of WO2007096082 A1, Aug. 30, 2017.
English abstract of WO2013063069 A1, May 2, 2013.
Mandavi et al, "A biodegradable and biocompatible gecko-inspired tissue adhesive", PNAS, vol. 105, No. 7, pp. 2307-12 (2008).
English abstract of DE102014119470 A1, Jun. 23, 2016.
English abstract of DE102012112965 A1, Jun. 26, 2014.
English abstract of WO2012054039 A1, Apr. 26, 2012.
English abstract of WO2010108003 A2, Sep. 23, 2010.
English abstract of DE102010026490 A1, Jan. 12, 2012.
Mota et al., "Multiscale fabrication of biomimetic scaffolds for tympanic membrane tissue engineering", Biofabrication, 2015, vol. 7, No. 2, 1-21.
English abstract of WO2016146792 A1, Sep. 22, 2016.
English abstract of WO 2018019879 A1, Jan. 2, 2018.

\* cited by examiner

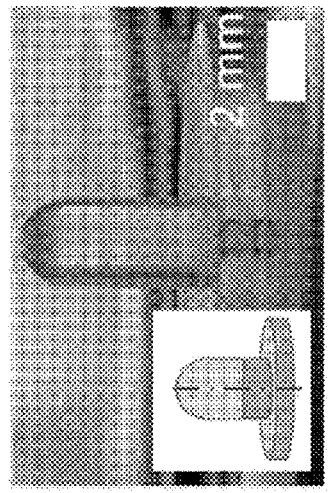
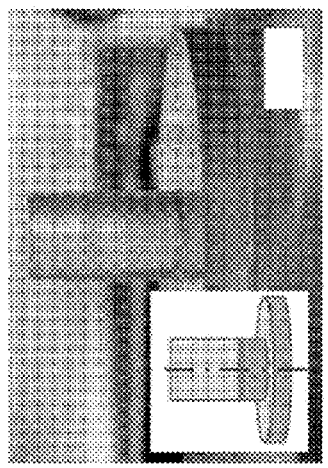
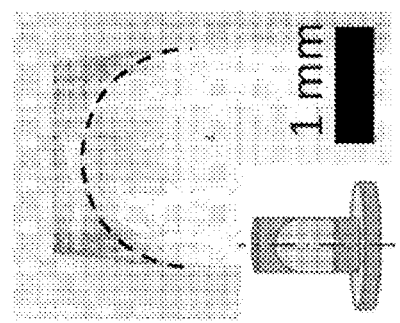
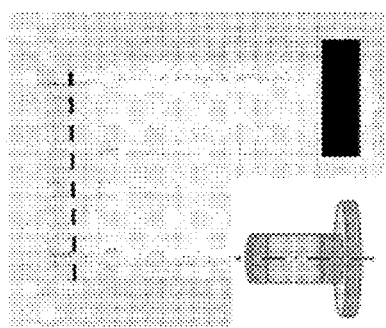
Fig. 13

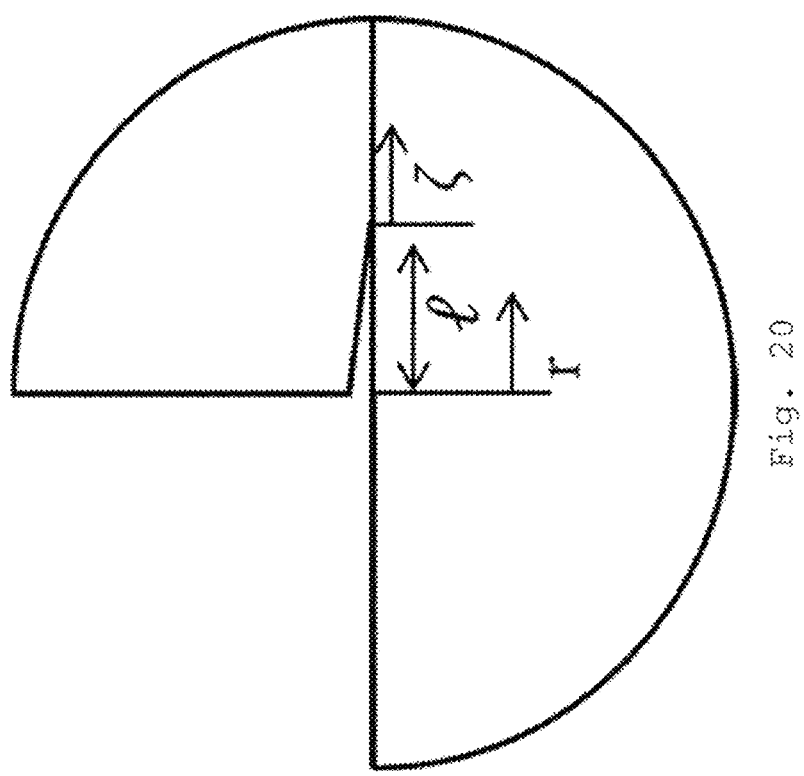

COMPOSITE PILLAR STRUCTURES

This patent application is a U.S. national stage application of PCT international application PCT/EP2016/055894 filed on 17 Mar. 2016 and claims priority of German patent document 10 2015 103 965.6 filed on 17 Mar. 2015, the entireties of which are incorporated herein by reference.

FIELD OF THE INVENTION

The invention relates to a structured surface with improved adhesion in particular to rough and/or soft surfaces and a method for production thereof.

BACKGROUND OF THE INVENTION

The adhesive organs of some arthropods and geckos disclose a promising concept for temporary, reversible adhesion. Their fibrillar nano- or microstructure enables forward movement through uniform adhesive contact on substrates of a great variety of materials also varying greatly in roughness. Since their discovery, these purely physically acting adhesion systems have been the subject of research to generate artificial systems of this nature. Successful concepts for mimicking fibrillar adhesion systems on the basis of elastomeric microstructures have been demonstrated in the very recent past for very smooth and hard substrate surfaces such as glass, silicon wafer or polished metal surfaces. Less successful so far, however, is the transfer of such adhesion mechanisms to rough and yielding surfaces, although these are not a rarity in nature and present no obstacle for arthropods and geckos.

Design parameters such as fibril diameter, aspect ratio and the geometrical shape of the contact point can be specifically varied by means of microstructuring techniques and then studied and analyzed. For example, it was found that fibrils with high aspect ratios better dissipate the elastic energy during detachment and consequently enable the obtention of greater adhesive forces. However, high aspect ratios are disadvantageous for the mechanical stability of such structures, since under compression these are liable to Euler buckling or agglomeration of adjacent fibrils takes place even without the action of force, owing to the decreased bending strength.

Fibrillar structures increase the elastic flexibility in the contact area, as a result of which these can adapt to rough substrates better than unstructured surfaces of the same material. It has been shown that with increasing roughness the adhesive strength decreases, but this effect can be countered with increased flexibility of the fibrillar structures. Theoretically, this can be described through the determination of the effective E modulus, in which the intrinsic E modulus of the solid is decreased as a function of the interpenetrating air volume. Thus, with the example of the β-keratin fibrils of the gecko, a reduction of the E modulus over 4 orders of magnitude was seen, to an effective elasticity modulus of ca. 100 kpA. In addition, hierarchically organized fibril structures have the ability to deal with rugosities over several scales of length, with each hierarchical step covering a defined order of magnitude.

In spite of the enormous increase in fundamental understanding concerning fibrillar adhesion systems in the last decade, their field of application is as yet limited almost exclusively to hard and smooth objects such as glass, wafer and polished metal surfaces. The adhesion mechanisms of such systems on soft, flexible substrates, often with viscoelastic properties, such as for example skin surfaces, are as yet only very little known. Further, in addition to its viscoelastic nature, skin is rough and moist to varying extents and thus represents a major challenge for research.

An important field of reversible adhesive bonding is dry adhesion on the basis of van der Waals forces, similarly to the gecko structures. These structures are detachable and can also be used many times. However, a problem is that the adhesive force of a surface can only be influenced to a limited extent.

Bae et al. (Bae, W. G., Kim, D., Kwak, M. K., Ha, L., Kang, S. M. & Suh, K. Y. (2013a). Enhanced skin adhesive patch with modulus-tunable composite micropillars. Adv. Healthc. Mater., 2, 109-113) were able to show that thin films on end faces of projections can improve the adhesion on soft surfaces such as skin. However, only thin films were used and only inadequately polymerized, which is a problem precisely with use on skin.

The objective of the invention is to provide a structured surface which has adhesive properties and avoids the disadvantages of the prior art. It should be particularly suitable for rough and soft surfaces. Moreover, a method should be provided which enables the production of such structured surfaces.

SUMMARY OF THE INVENTION

This problem is solved by the inventions with the characteristics of the independent claims. Advantageous extensions of the inventions are characterized in the subclaims. The wording of all claims is hereby by reference included in the content of this description. The inventions also comprise all reasonable and in particular all mentioned combinations of independent and/or dependent claims.

The problem is solved by the structured surface of a solid body, wherein the surface has a structuring which comprises a large number of projections (pillars), which each have at least one stem and comprise an end face pointing away from the surface. In this, the stem comprises in the longitudinal direction at least two regions with different elasticity modulus, wherein two regions adjoin one another and form a phase boundary.

Here region is understood to mean a part of the projection which at at least one point comprises a complete cross-section parallel to the base area of the projection. Preferably, except for regions of the interface, a region always comprises the same cross-section of the projection. Individual regions then build the projection similarly to the building of a column of different building blocks (regions), which each comprise a column segment. The areas at which the regions contact one another are regarded as interfaces. Depending on the production process, the interfaces can also comprise thin layers of bonding aids.

Within such a region, the elasticity modulus is preferably constant.

Surprisingly it has now been found that such assembled projections lead to an improvement in the adhesion, in particular on rough and smooth surfaces. Also, through selection of the geometry of the interface, in particular with curved interfaces, the adhesion can be further increased, in particular with advantageous ratios of the elasticity moduli and the dimensions of the regions. Thus adhesions can be achieved which otherwise were possible only with broadened end faces (mushrooms), which are however difficult to produce and with use of soft materials tend to collapse. It is presumed that the shift of the maximal tension in the contact region from the edge to the center is responsible for the advantageous properties.

In a preferred embodiment of the invention, the region with a lower elasticity modulus, preferably the region with the lowest elasticity modulus, comprises the end face. This means that the end face also consists of this material. Through this structure, it is achieved that the stem of the projection is less elastic than the region of the end face. The stem of the column therefore tends less to agglomeration, with or without loading. At the same time, the end face is more elastic and can adapt itself better to rough surfaces.

In a preferred embodiment of the invention, the phase boundary is not parallel to the end face of the respective projection.

In one embodiment of the invention, the vertical thickness of the region which comprises the end face, relative to the phase boundary to the adjoining region, is not constant. This is the case when this phase boundary is not parallel to the end face. Here, vertical thickness is understood to mean the distance between end face and phase boundary in the longitudinal direction of the projection. Thus for example the end face can be curved and the interface forms a plane, or the end face is planar shaped and the interface is curved. Preferably the thickness of the region increases or decreases towards the edge in every direction. This is the case if at least one of the two areas (end face or phase boundary) has a curvature. The two surfaces can also be differently curved.

In a preferred embodiment of the invention, at least one phase boundary between two regions has a curvature. Preferred is a curvature of the interface with at least one minimum or maximum within the projection, preferably with one minimum or maximum. This phase boundary is preferably parabolic, hemispherical to bowl-shaped.

An interface is regarded as curved in particular if the interface itself is not a plane which intersects the projection. The interface in that case can also show a curvature only towards the edge, while it runs flat in the middle of the projection.

Such an interface shape has the effect that in this section of the projection both materials with different elasticity or bending strength are present and inter-penetrate. It was found that such an arrangement increases the adhesive strength of such a projection and also decreases the tendency to collapse.

In one embodiment of the invention, the ratio of the minimum vertical thickness of the region comprising the end face relative to the height of the projection is less than 0.5, in particular less than 0.3, in particular less than 0.1. As a result, changes in the vertical thickness, e.g. with curved phase boundaries, affects the adhesion particularly strongly. The optimal ratio can also depend on the ratio of the elasticity moduli, and on the geometry of the interface.

The vertical height of the end face is understood to mean the distance of the end face to the surface on which the projections are positioned.

In one embodiment of the invention, the region which comprises the end face comprises no more than 50% of the volume of the projection, preferably not more than 40%, 30% or 20% of the volume of the projection. Preferably, independently of this, this region comprises at least 15%, at least 10%, or at least 2% of the volume of a projection. Here, volume of a projection is understood to mean the volume enclosed starting from the base face and the end face, including any possibly broadened end faces.

In one embodiment of the invention, the curvature is convex in the direction of the end face, i.e. the phase boundary has a maximum. Preferably, the curvature is a spherical curvature, in particular with a radius up to double the diameter of the projection, in particular up to at least the diameter of the projection.

In a further embodiment of the invention, on detachment from a surface the projection exhibits a start of the detachment in the middle of the projection. The advantageous parameters for elasticity modulus, size ratio and geometry of the interface, in particular convex interface, can be determined by simulations and measurements.

In a preferred embodiment of the invention, the projections of the structured surface of the invention are columnar in shape. This means that they are preferably projections formed perpendicular to the surface, which have a stem and an end face, wherein the stem and the end face can have any cross-section (for example circular, oval, rectangular, square, rhomboidal, hexagonal, pentagonal, etc.).

Preferably the projections are shaped such that the vertical projection of the end face onto the base area of the projection forms an overlap area with the base area, wherein the overlap area and the projection of the overlap area onto the end face bounds a body which lies completely within the projection. In a preferred embodiment of the invention, the overlap area comprises at least 50% of the base area, preferably at least 70% of the base area, and especially preferably the overlap area comprises the whole base area. The projections are therefore preferably not inclined, but they can be.

In a preferred embodiment, the end face is oriented parallel to the base area and to the surface. If the end faces are not oriented parallel to the surface and therefore have different vertical heights, the average vertical height of the end face is regarded as the vertical height of the projection.

In one embodiment, the end face of the projections is larger than the base area.

In a preferred embodiment of the invention, the stem of the projection relative to its average diameter has an aspect ratio of height to diameter of 1 to 100, preferably 1 to 10, especially preferably 2 to 5.

In one embodiment, the aspect ratio is at least 3, in particular at least 7, preferably 3 to 15, especially preferably 3 to 10.

Such projections are obtainable in particular with the method according to the invention.

Here the average diameter is understood to mean the diameter of the circle which has the same area as the relevant cross-section of the projection, determined over the whole height of the projection.

In a further embodiment of the invention, the ratio of the height of a projection to the diameter at a defined height over the whole height of the projection always lies at 1 to 100, preferably 1 to 10, especially preferably 2 to 5. In one embodiment, this aspect ratio lies at at least 3, in particular at least 7, preferably 3 to 15, especially preferably 3 to 10. Here diameter is understood to be the diameter of the circle which has the same area as the corresponding cross-section of the projection at the defined height.

The projections can have broadened end faces, so-called "mushroom" structures.

In a preferred embodiment, the projections do not have broadened end faces.

The end faces of the projections can themselves be structured in order to increase their surface area. In this case, the average vertical height of the end face is regarded as the vertical height of the projections.

In a preferred embodiment, the vertical height of all projections lies in a range from 1 μm to 10 mm, preferably 1 μm to 5 mm, in particular 1 μm to 2 mm, preferably in a range from 10 μm to 2 mm.

In a preferred embodiment, the base area from the area upwards corresponds to a circle with a diameter between 0.1 μm to 5 mm, preferably 0.1 μm and 2 mm, especially preferably between 1 μm and 500 μm, especially preferably between 1 μm and 100 μm. In one embodiment, the base area is a circle with a diameter between 0.3 μm and 2 mm, preferably 1 μm and 100 μm.

The average diameter of the stems preferably lies between 0.1 μm to 5 mm, preferably 0.1 μm and 2 mm, especially preferably between 1 μm and 100 μm. The height and the average diameter is preferably adapted in accordance with the preferred aspect ratio.

In a preferred embodiment with broadened end faces, the surface area of the end face of a projection is at least 1.01 times, preferably at least 1.5 times as large as the area of the base area of a projection. It can for example be greater by the factor 1.01 to 20.

In a further embodiment, the end face is between 5% and 100% larger than the base area, especially preferably between 10% and 50% of the base area.

In a preferred embodiment, the distance between two projections is less than 2 mm, in particular less than 1 mm.

The projections are preferably positioned with regular spacing.

The elasticity modulus of all regions of the projection is preferably 50 kPa to 3 GPa. Preferably the elasticity modulus of soft regions, i.e. in particular the region comprising the end face, lies at 50 kPa to 20 MPa, preferably 100 kPa to 10 MPa. Independently of this, the elasticity modulus of the regions with high elasticity modulus lies preferably 1 MPa to 3 GPa, preferably 2 MPa to 1 GPa. Preferably for all softer and harder regions the elasticity moduli lie in the ranges stated above. Preferably, the elasticity modulus of the regions of the projection decreases towards the end face.

The ratio of the elasticity modulus of the region with the lowest elasticity modulus and the region with the highest elasticity modulus preferably lies below 1:2000, in particular below 1:1500, preferably below 1:1200, and independently thereof at least at 1:1.1, preferably at least 1:1.5, in particular at 1:2. However, a ratio of up to 1:1000 can be advantageous.

In a further embodiment of the invention, the ratio of the elasticity modulus of the region with the lowest elasticity modulus and the region with the highest elasticity modulus preferably lies at 1:5 to 1:50 (soft to hard), in particular at 1:10 to 1:20.

In a further embodiment, the ratio lies between 1:1.1 to 1:500, in particular at 1:1.5 to 1:5. Thereby, the harder region also remains adequately flexible, for example for nonplanar or curved surfaces.

The projections can consist of many different materials, elastomers are preferred, and crosslinkable elastomers especially preferred. The regions of higher elasticity modulus can also comprise thermosetting plastics.

The projections can therefore comprise the following materials:

epoxy and/or silicone-based elastomers, polyurethanes, epoxy resins, acrylate systems, methacrylate systems, polyacrylates as homo- and copolymers, polymethacrylates as homo- and copolymers (PMMA, AMMA, acrylonitrile/methyl methacrylate), polyurethane (meth)acrylates, silicones, silicone resins, rubber, such as R rubber (NR natural rubber, IR polyisoprene rubber, BR butadiene rubber, SBR styrene-butadiene rubber, CR chloroprene rubber, NBR nitrile rubber), M rubber (EPM ethene-propene rubber, EPDM ethylene-propylene-dien rubber), unsaturated polyester resins, formaldehyde resins, vinyl ester resins, polyethylene as homo- or copolymers, and mixture and copolymers of the aforesaid materials. Also preferred are elastomers which are permitted for use in the sector packaging, pharmaceuticals and foods by the EU (according to EU Directive No. 10/2011 of 14 Jan. 2011, published on 15 Jan. 2011) or the FDA or silicone-free UV curable resins from PVD and CVD process technology. In this, polyurethane (meth)acrylates stands for polyurethane methacrylates, polyurethane acrylates, and mixtures and/or copolymers thereof.

Preferred are epoxy and/or silicone-based elastomers, polyurethane (meth)acrylates, polyurethanes, silicones, silicone resins (such as UV curable PDMS), polyurethane (meth)acrylates and rubber (such as EPM and EPDM).

In one embodiment of the invention, at least two of the projections of the structured surface are connected together via a film on the end face. This film can have a similar elasticity modulus to the material of the end faces. Here a film is understood to mean a material linkage with constant thickness which lies on the end faces and also bridges the region between the projections. As a result, the film, if a larger number of projections is bridged, forms a closed surface with the projections. This can be advantageous when soiling of the structured surface is to be avoided. The enclosed gas also contributes to the elasticity of the surface thus structured. Because of the elasticity and low thickness of the film, the positive adhesion properties of the projections are maintained.

The film preferably has a thickness which lies below 50%, preferably below 30% of the vertical height of the bridged projections. Also, the film is not included in the calculation of the height.

The film preferably has a thickness of below 2 mm, preferably below 1 mm, and especially preferably below 800 μm.

The invention also relates to a method for producing a structured surface of a solid body, wherein the surface has a structuring which comprises a large number of projections which each have at least one stem with an end face pointing away from the surface, wherein the stem in the longitudinal direction comprises at least one region with lower elasticity modulus and at least one region with higher elasticity modulus.

Below, individual process steps are described in more detail. The steps do not necessarily have to be performed in the stated order, and the method to be described can also have further, not mentioned steps.

For this, firstly a template for the molding of projections is produced. Into this template, a first composition comprising a precursor for the material for the end faces is introduced as a liquid, preferably as a solution in a solvent. Preferably this is a material with a lower elasticity modulus in the cured state than the other materials used. The composition collects in the depressions of the template, which are provided for the projections.

Through the differences in wetting between the template and the composition, a meniscus forms in the template. This can for example be concave or convex in shape.

It can be necessary to evaporate at least part of the solvent before the next step.

Introduction as a solution is preferred since thereby the quantity of remaining material can be better controlled. Also, the shape of the meniscus is simple to influence thereby. The shape of the subsequent interface to the next regions can thereby be controlled. Interfaces as they are described for the projections, preferably with a curved interface, are preferred.

It is also possible to coat the template appropriately beforehand in order to establish a defined surface wetting.

Optionally the composition can also already be completely or partially cured.

If necessary, a small quantity of binder or crosslinking aid can be applied in order to improve the bonding to the next material.

This can for example be necessary if the two materials are based on different curing mechanisms. The surface of the composition can also be treated, e.g. by plasma treatment, in order to create binding sites for the next composition.

The step can be repeated several times for example in order to introduce further regions into the projections.

In a preferred embodiment, the template thus prepared is used for molding with the material of the stem. Thereby, the material already present in the template binds with the material for the stems.

Preferably in a last step the material for the backing layer, i.e. the surface on which the projections are positioned, is applied onto the template and cured. Especially preferably this is the same material as for the stems of the projections, so that backing layer and the stems are produced in one step.

In the next step, the composition last applied and/or all previously applied compositions are cured. After this, the structured surface is released from the template. A structured surface with projections which consist of at least two regions is obtained.

The method allows the simple production of projections which comprise at least two different materials, in particular with control of the interface forming between the materials. Since the shape of the interface has a positive effect on the adhesion properties, surfaces with improved adhesion properties can be obtained without the need for complicated steps such as the formation of mushroom structures, which mostly require markedly more steps and are only transferable with difficulty to larger areas. The production of the templates is also simpler. Softer materials can also be used, which cannot be used in the conventional production methods.

Because of the use of the template, The method according to the invention also allows the production of projections with particularly high aspect ratios, for example greater than 3. In methods which modify projections with no template, this is not possible without collapse of the projections. Apart from this, in the method according to the invention many different materials can be combined with one another. Thus composite projections made of silicones and polyurethane acrylates are also possible.

The invention also relates to a method for production of the projections according to the invention, in which firstly the region with the higher elasticity modulus, preferably with a part of the base layer on which the projections are positioned, is produced with an appropriately shaped mold, wherein the mold also determines the geometry of the subsequent interface. The molded stem is then transferred into a further mold, which in combination with the stem introduced forms an appropriate cavity for the next region. After this, the material for the next region is introduced into this cavity. As a result, the interface of the desired geometry is accurately formed. This step can also be repeated several times in order to build up further regions. In a last step, it can be necessary to remove excess material in order to obtain a consistent contact area. Apart from this, depending on the material, the method can also comprise drying and curing steps (e.g. chemical or physical).

The invention also relates to a combination of two bodies, wherein the interface has a structured surface according to the invention.

The structured surfaces of the invention are particularly suitable for rough and soft surfaces. These are in particular natural surfaces, such as skin.

Further details and characteristics emerge from the following description of preferred practical examples in combination with the subclaims. Herein, the respective characteristics can be implemented for themselves alone or as several in combination with one another. The possibilities for solving the problem are not restricted to the practical examples. Thus for example range statements always include all—not mentioned—intermediate values and all conceivable part intervals.

The practical examples are shown schematically in the diagrams. In these, the same reference symbols in the individual diagrams designate the same or functionally similar elements or those corresponding to one another in their functions. Specifically these show:

BRIEF DESCRIPTION OF THE DRAWINGS

FIG. 13 Pictures of the projections produced after the first molding (above) and pictures of the interface in projections according to the invention;

FIG. 20 Schematic representation of a small detachment, starting from the edge of the contact area between substrate (lower semicircle) and projection (above).

DETAILED DESCRIPTION OF INVENTION

Figure 1:
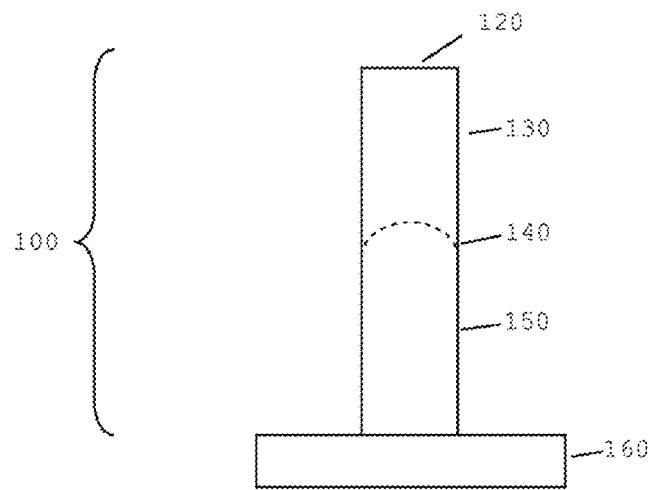
FIG. 1 Embodiment of the invention.

FIG. 1 shows a cross-section through a projection 100 according to the invention. This projection comprises a region with lower elasticity modulus 130, which comprises the end face 120, and a region with higher elasticity modulus 150. The two regions adjoin one another at the phase boundary 140, which in this embodiment has a curvature. The projection is positioned on a surface 160. These surfaces on which the projections are positioned can also be designated as backing layer or back layer.

Figure 2:
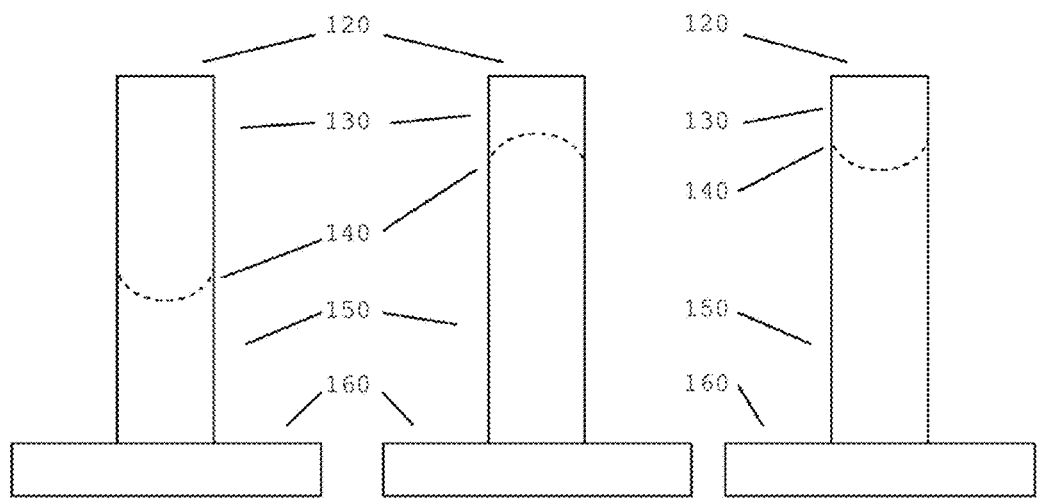
FIG. 2 Further embodiments of the invention.

FIG. 2 shows further embodiments of the invention as a cross-section through projections 100. Each of the projections comprises a region with lower elasticity modulus 130, which comprises the end face 120, and a region with higher elasticity modulus 150. The two regions adjoin on another at the phase boundary 140, which in this embodiment has a curvature. All projections are positioned on a surface 160. The embodiments differ in the curvature of the phase boundary and the ratio of the two regions to one another. In the two right-hand embodiments the region 150 is markedly greater than the region 130. As a result, the projections themselves are markedly more rigid, but because of the region 130 retain their good adhesion properties.

Figure 3:
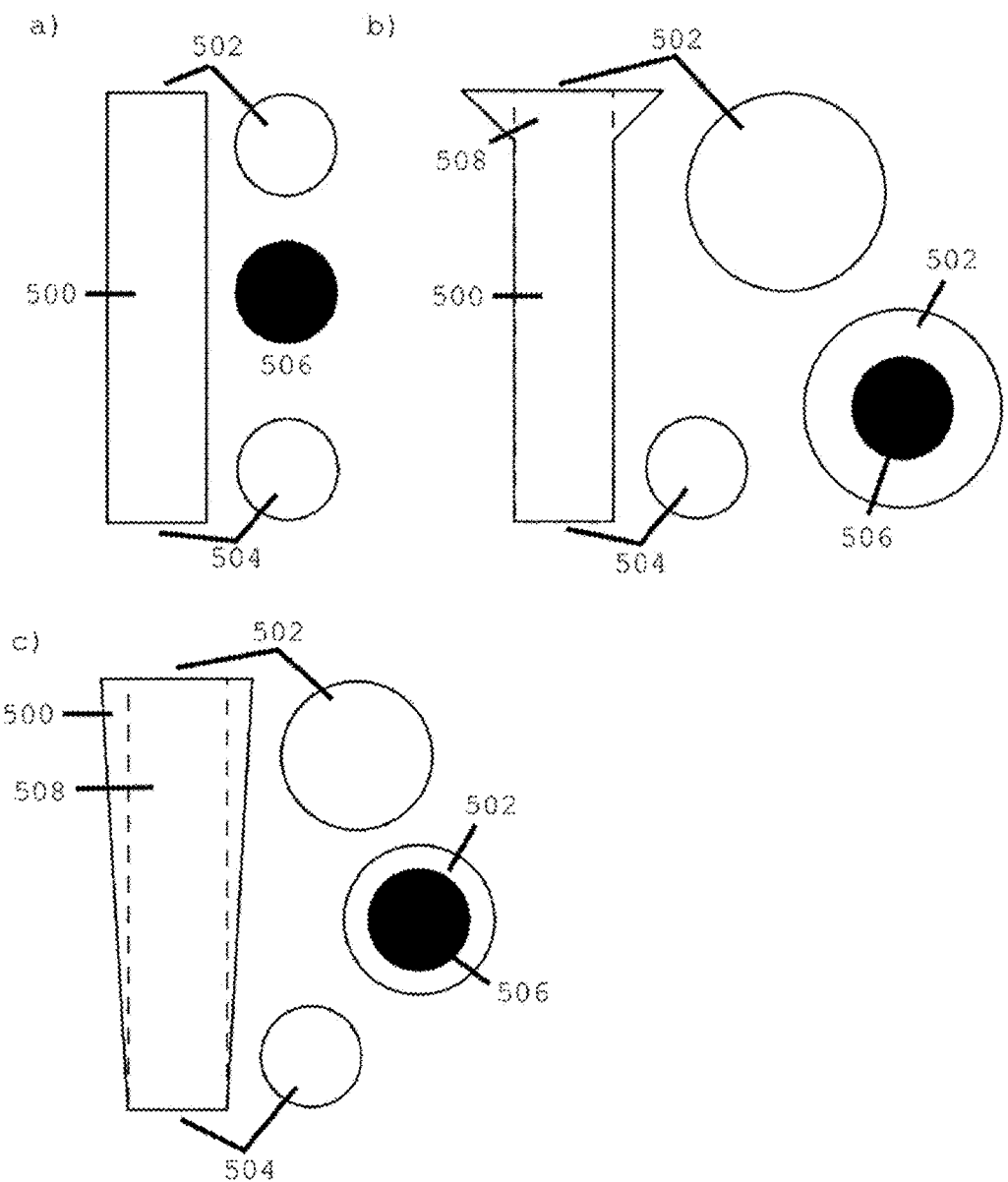
FIG. 3 Schematic representation of various embodiments of projections.

FIG. 3 shows a schematic representation of embodiments of a projection. A projection 500 comprises an end face 502 and a base area 504. The end face 502 and base area 504 are shown in side view (on left) and plan view (on right). The black area 506 shows the overlap region of a vertical projection of the end face 502 onto the base area 504. It can be identical with the areas (a)) or in the case of a broadened end face (b) and c)) lie within the end face 502. The body 508 bounded by the projection of the overlap region 506 onto the end face is shown by a dashed line. With all projections, it lies within the projection, whereby in case a) it is identical with the projection itself. Within therefore also includes shared outer areas.

Figure 4:
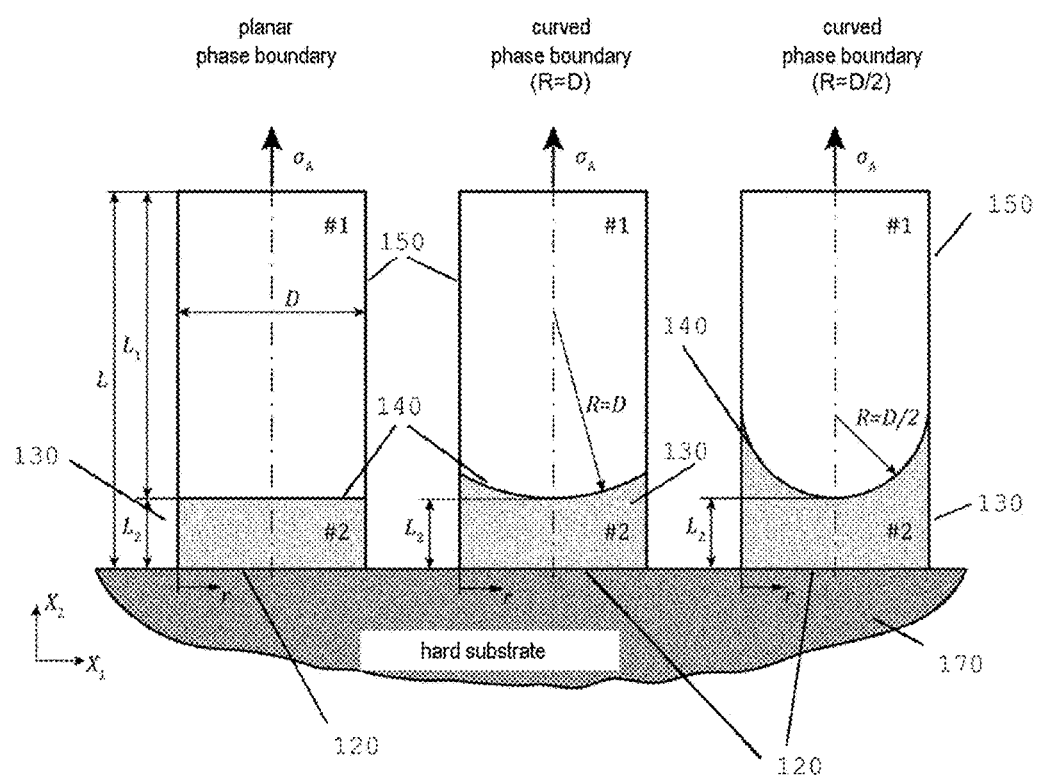
FIG. 4 Schematic representation of a projection with various geometries of the phase boundaries in contact with a surface; composite pillars with planar interface (on left), and curved interface (R=D; middle and R=D/2 on right). R is the radius of the columnar pillar; D stands for the diameter; L is the total height, $L_1$ and $L_2$ are the heights of the more rigid region (#1) and the softer region (#2); the composite pillars adhere with their end faces on a rigid substrate and a tensile force $\sigma_A$ acts on the free end; the vertical stress (tensile stress) along the contact area of the composite pillar and the substrate during pulling off is calculated.

FIG. 4 shows a schematic representation of the projection, which was simulated with various geometries of the phase boundary. The projection is shown as a cross-section and is circular symmetrical. It has a diameter D and a height L. The axis of symmetry is shown by a dashed line. The phase boundary 140 is planar (on left) or spherically curved, wherein it has a maximum in the longitudinal direction of the projection. The radius of curvature of the phase boundary is D (middle) or D/2 (on right). The height $L_1$ designates the vertical height from the foot of the projection up to the maximum of the phase boundary, the height $L_2$ the vertical height up to the end face of the projection measured from the maximum of the phase boundary. The end face 120 of the projection is in contact with a substrate surface 170. In the region of the height $L_1$ a hard material is positioned, and in the region of the height $L_2$ a soft material. In the simulation, the surface 170 is simulated as hard.

In the simulation, a tensile force $\sigma_A$ was applied on the free end of the projection. The distribution of the tensile stress within the projection changes greatly when $L_1$ and $L_2$ are varied. A singular stress field develops close to the edge of the projection and the rigid surface 170. The resulting edge singularity has the form $H_n r^{\lambda_n - 1}$, wherein H and $\lambda - 1$ are the tensile intensity and the order of the stress singularity. n=1, 2 correspond to projection and surface. r is the distance from the edge.

Figure 5:
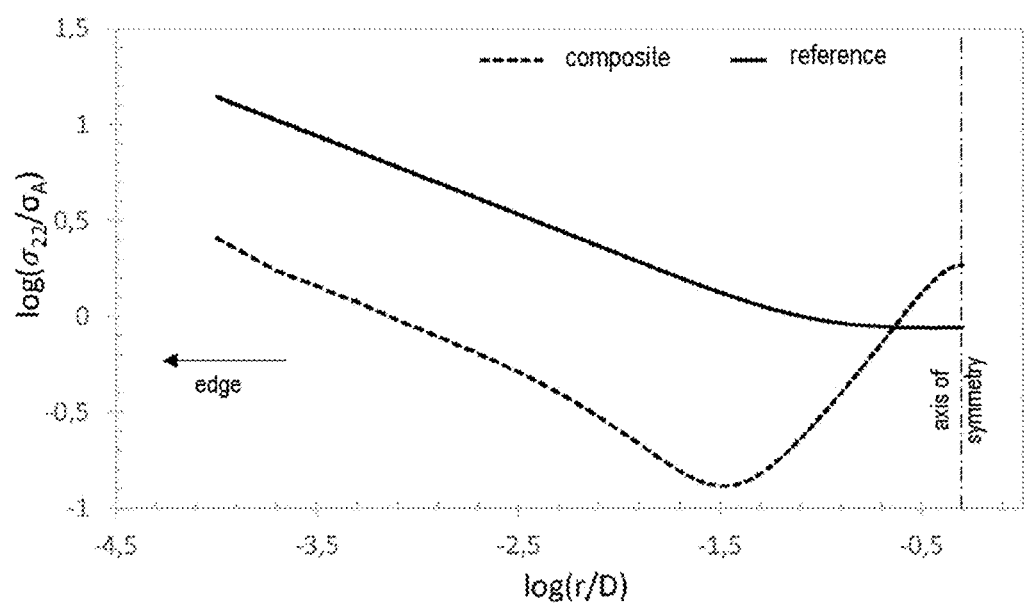
FIG. 5 Normal stress $\sigma_{22}$ along the projection/substrate interface, normalized to the tensile force $\sigma_A$.

The stress distribution was simulated for various ratios of $L_1$ and $L_2$, during which the height $L=L_1+L_2$ remained constant. The ratio L/D was 2. As the simulation software, Abaqus (Simulia) was used. For the region with the higher elasticity modulus, 1.3 GPa were selected and for the region with lower elasticity modulus 2 MPa were selected. The resulting normal stress $\sigma_{22}$ normalized to the tensile force $\sigma_A$ is shown in FIG. 5. "Composite" is the stress distribution for $L_2/L$ equals 0.05. The reference is a linear projection consisting of a material with planar end face without curvature.

The simulations show the stress distribution along the end faces/surfaces interface. With large heights $L_2$ the stress at the outer edge of the projection is very high. This favors crack formation at the outer edge of the projection during the detachment process. With decreasing heights $L_2$ the stress at the outer edge of the projection decreases and the stress in the center simultaneously increases. With very small heights $L_2$ the stresses at the edge and in the center are of almost equal magnitude, which favors crack formation in the center. These results indicate that the adhesion stress increases with decreasing layer thickness $L_2$.

FIGS. 6 to 9 show further simulations and experimental results. In these, composite pillars corresponding to the description of FIGS. 12 and 13 were used. In the descriptions for the figures, the notation from FIG. 12 was correspondingly used.

For the simulations, a columnar projection with a diameter D and a length L on a rigid substrate without defects along the contact area was assumed. The projection is assumed to be isotropically elastic and as an incompressible solid body. A tensile stress $\sigma_A$ acts on the free end, which results in a stress singularity at the projection/substrate interface. The "corner singularity" method was taken and adapted from Akisanya, A. R., Fleck, N. A., 1997. Interfacial cracking from the free edge of a long bi-material strip. International Journal of Solids and Structures 34, 1645-1665; and Khaderi, S. N., Fleck, N. A., Arzt, E., McMeeking, R. M., 2015. Detachment of an adhered micropillar from a dissimilar substrate. Journal of the Mechanics and Physics of Solids 75, 159-183. The singularity conditions for the asymptotic normal stress $\sigma_{22}$ and the shear stress ($\sigma_{12}$) are shown in the equations (1) and (2):

$$\sigma_{22} = H_1 r^{-0.406} \tag{1}$$

$$\sigma_{12} = 0.505 H_1 r^{-0.406} \tag{2}$$

wherein r is the distance from the edge of the projection. The directions $X_1$ and $X_2$ are stated in FIG. 4. Here the expression $H_1$ is dependent on the diameter D, the tensile stress $\sigma_A$ and the calibration coefficients $\tilde{a}$ and can be written as follows:

$$H_1 = \sigma_A D^{0.406} \tilde{a} \tag{3}$$

The calibration coefficients for a linear projection (straight punch) is $a_1$=0.278 for a 3-dimensional axially symmetrical elongation (Khaderi, S. N., Fleck, N. A., Arzt, E., McMeeking, R. M., 2015. Detachment of an adhered micropillar from a dissimilar substrate. Journal of the Mechanics and Physics of Solids 75. 159-183). The solutions for the normalized asymptotic normal and shear stresses are therefore $$\log(\sigma_{22}/\sigma_A) = -0.556 - 0.406 \ \log(r/D)$$

and $$\log\left(\frac{\sigma_{12}}{\sigma_A}\right) = -0.853 - 0.406 \ \log\left(\frac{r}{D}\right)$$

In order to predict the adhesion strength of a pillar, a crack (detachment) of length l was assumed at the edge of the contact area (FIG. 20), where the "corner singularity" determines the detachment behavior. The stress distributions at the crack tip (crack) can be described by $$\sigma_{22} = \frac{K_I}{\sqrt{2\pi\zeta}} \tag{4}$$

and $$\sigma_{12} = \frac{K_{II}}{\sqrt{2\pi\zeta}}$$

wherein $\zeta$ is the distance from the crack tip or the edge of the detachment. A schematic representation is shown in FIG. 20 with a detachment beginning at the edge and the length l. The mode I and mode II stress intensity factors, $K_I$ and $K_{II}$, are given as $$K_I = 2.6 H_1 l^{0.094} = 2.6 \sigma_A D^{0.406} \tilde{a} l^{0.094} \tag{5}$$

and $$K_{II} = 0.8 H_1 l^{0.094} = 0.8 \sigma_A D^{0.406} \tilde{a} l^{0.094} \tag{6}$$

The energy release rate during the detachment is $$G = \frac{1-\nu^2}{2E}(K_I^2 + K_{II}^2) = \frac{3}{8E}(K_I^2 + K_{II}^2) = \frac{2.8\sigma_A^2 D^{0.81} l^{0.19} \tilde{a}^2}{E_1}, \tag{7}$$

wherein E the elasticity modulus and $\nu$ the transverse extension number (Poisson's ratio), is equal to 0.5, which corresponds to incompressibility. For detachment to occur, the energy release rate must be equal to the adhesion energy, W. The adhesion energy of a composite pillar $S^I$ can be expressed as:

$$S^I = \frac{0.6\sqrt{EW}}{D^{0.406} l^{0.094} \tilde{a}} \tag{8}$$

The adhesion strength can be normalized by dividing the adhesion strength by the adhesion strength of a linear projection (straight punch) $S^{punch}$ assuming the same initial detachment length (crack length, l):

$$\frac{S^I}{S^{punch}} = \frac{a_1}{\tilde{a}} \tag{9}$$

The adhesion strength was calculated with equation 9.

In order to study the influence of the geometry of the interface, various interface geometries (FIG. 4) and uniform projections were studied. The calculations were performed three dimensionally axially symmetrically. For each interface geometry, six different ratios of the two regions ($L_2$/L=0.25, 0.20, 0.15, 0.10, 0.05 and 0.005) and five ratios of the elasticity moduli ($E_1/E_2$=2, 10, $10^2$, $10^3$ and $10^6$) were studied.

In order to be able to compare the calculated results, composite pillars of PEGdma (350 MPa)/PU (900 kPa) and PDMS (2 MPa)/PU (900 kPa) and only of PU (straight punch reference sample) were produced analogously to the experiments described later. According to the method, projections corresponding to FIG. 12 with a diameter of 2 mm and a height of about 4 mm with varying thickness of the upper region were produced. The projections could have a planar phase boundary or a spherically curved (R=D/2) phase boundary.

Figure 14:
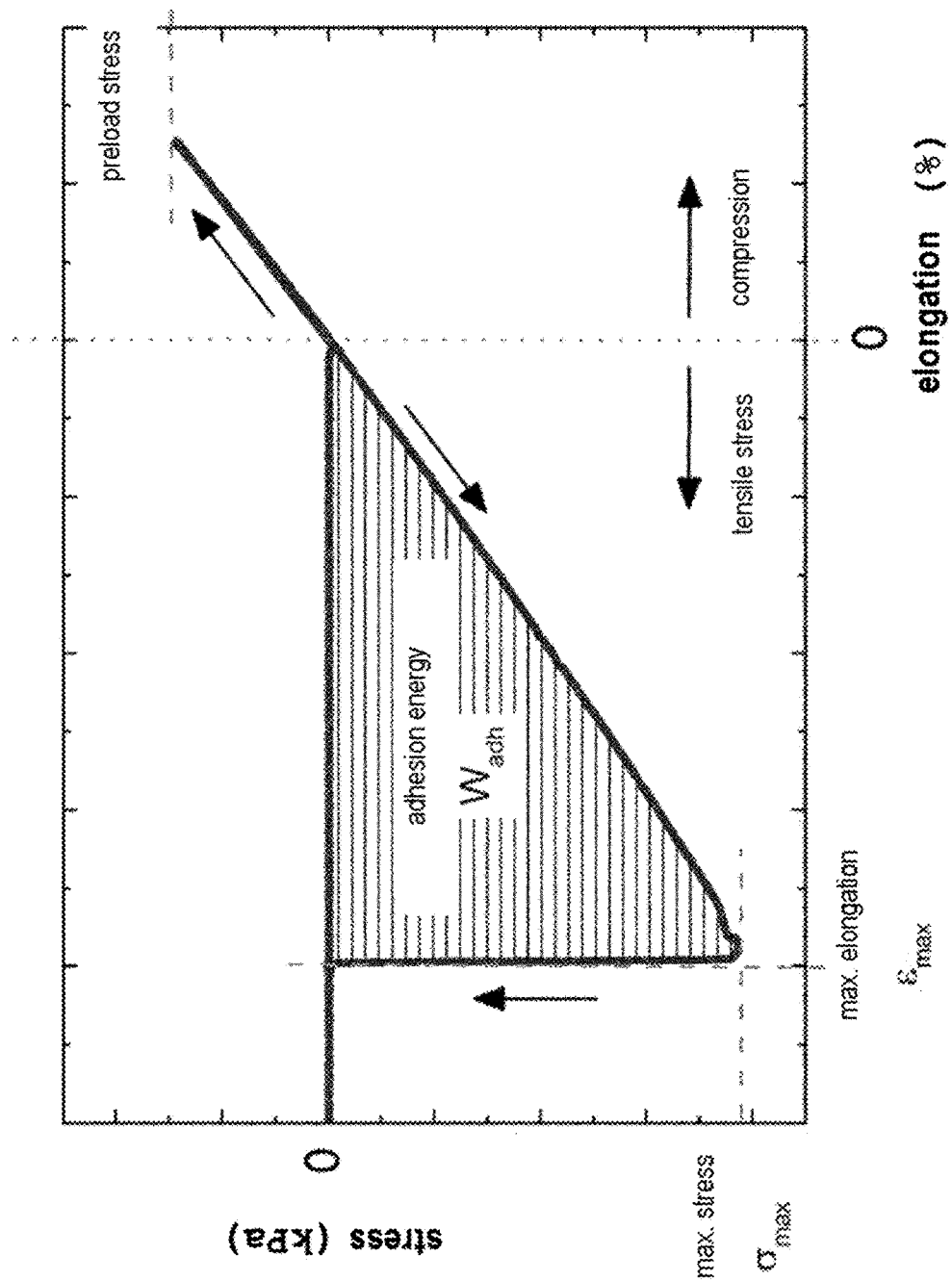
FIG. 14 Representation of a stress-strain curve during adhesion measurement.

The adhesion experiments were performed with a speed of 5 μm/s with a glass substrate as the surface. After contacting with the surface, the samples were moved vertically towards the surface until attainment of a preload and then moved away again from the surface until complete detachment (FIG. 14). The pull-off force necessary for this is the force which is needed for complete detachment. However, a certain force is also necessary in order to obtain a first detachment of the contact area. The force necessary for this was also studied.

For each sample, the preload was increased in steps from 40 to 150 mN and all pull-off forces obtained averaged over all preloads. The adhesion measurements were performed on two positions of the substrate.

Figure 6:
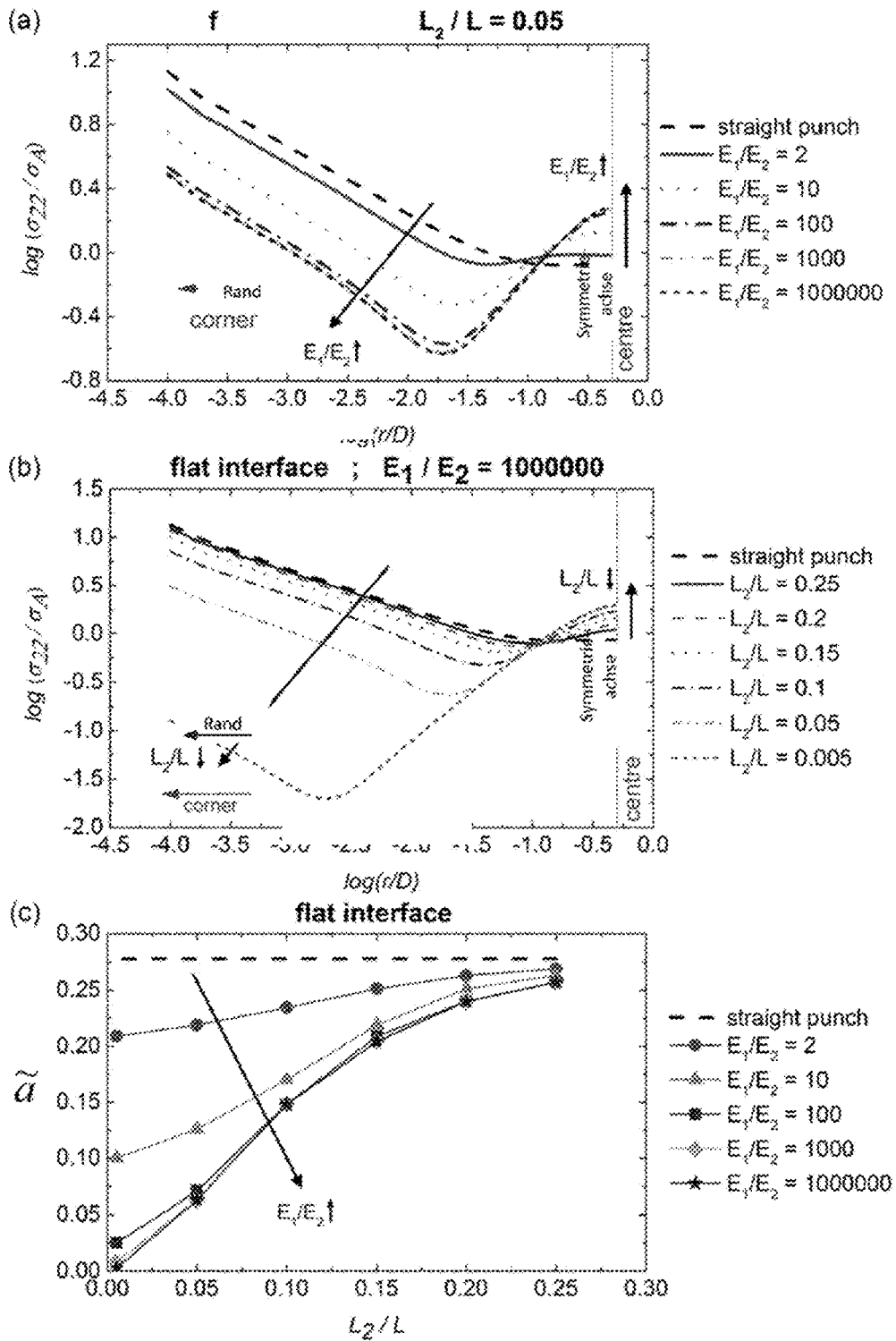
FIG. 6 Analysis of a composite pillar with planar interface (a) tensile stress $\sigma_{22}$ along the composite pillar/substrate contact area for different combinations of elasticity modulus ratios $E_1/E_2$ of the harder/upper and softer/lower part of the composite pillar, and constant ratio of $L_2/L=0.05$; (b) tensile stress $\sigma_{22}$ along the composite pillar/substrate contact area for different combinations of the thickness of the softer region $L_2$ normalized to the total height L and a constant ratio $E_1/E_2=1000000$; (c) calibration coefficient of composite pillars for various combinations of ratio of the height $L_2/L$ and elasticity modulus ratio $E_1/E_2$; the dashed line stands for the results for reference sample ("straight punch")

The results of the calculations with composite pillars with planar phase boundary, i.e. parallel to the contact area and perpendicular to the central axis of the composite pillar, are shown in FIG. 6. Here FIG. 6 a) shows the influence of the ratios of the elasticity moduli at a constant thickness of the upper region ($L_2/L=0.05$). The normal stress along the composite pillar/substrate interface, normalized with the tensile stress ($\sigma_{22}/\sigma_A$), is plotted against the normalized distance to the edge (r/D). It is seen that an increase in $E_1/E_2$ from 1 to $10^6$ leads to a decrease in the normal stress at the edge, while at the same time the stress value in the center of the pillar increases for some $L_2/L$ ratios and finally reaches a maximum value of ca. 0.3. Beyond a ratio of 1000 ($E_1/E_2$) the stress behavior for composite pillars with a ratio $L_2/L$ from 0.25 to 0.05 changes, but the stress at the edges decreases still further for a composite pillar with a ratio $E_1/E_2=10^6$ and $L_2/L=0.005$. In comparison to the solution for a conventional projection (shown as dashed line), all composite pillars show a lower stress at the edge, at the expense of a higher stress in the center. FIG. 6 b) shows the influence of the thickness $L_2$ of the soft material for a constant ratio $E_1/E_2=10^6$. It is seen that the thickness $L_2$ has a major influence on the calculated stress distribution. A lower thickness reduces the stress at the edges more markedly and the stress in the center increases, until a value of about 0.3 is reached. The results from FIGS. 6 a) and b) were fitted against the asymptotic stress solution from equation 3 in order to find the calibration coefficients ã for various combinations of $E_1/E_2$ and $L_2/L$. The results are shown in FIG. 6 c).

Figure 7:
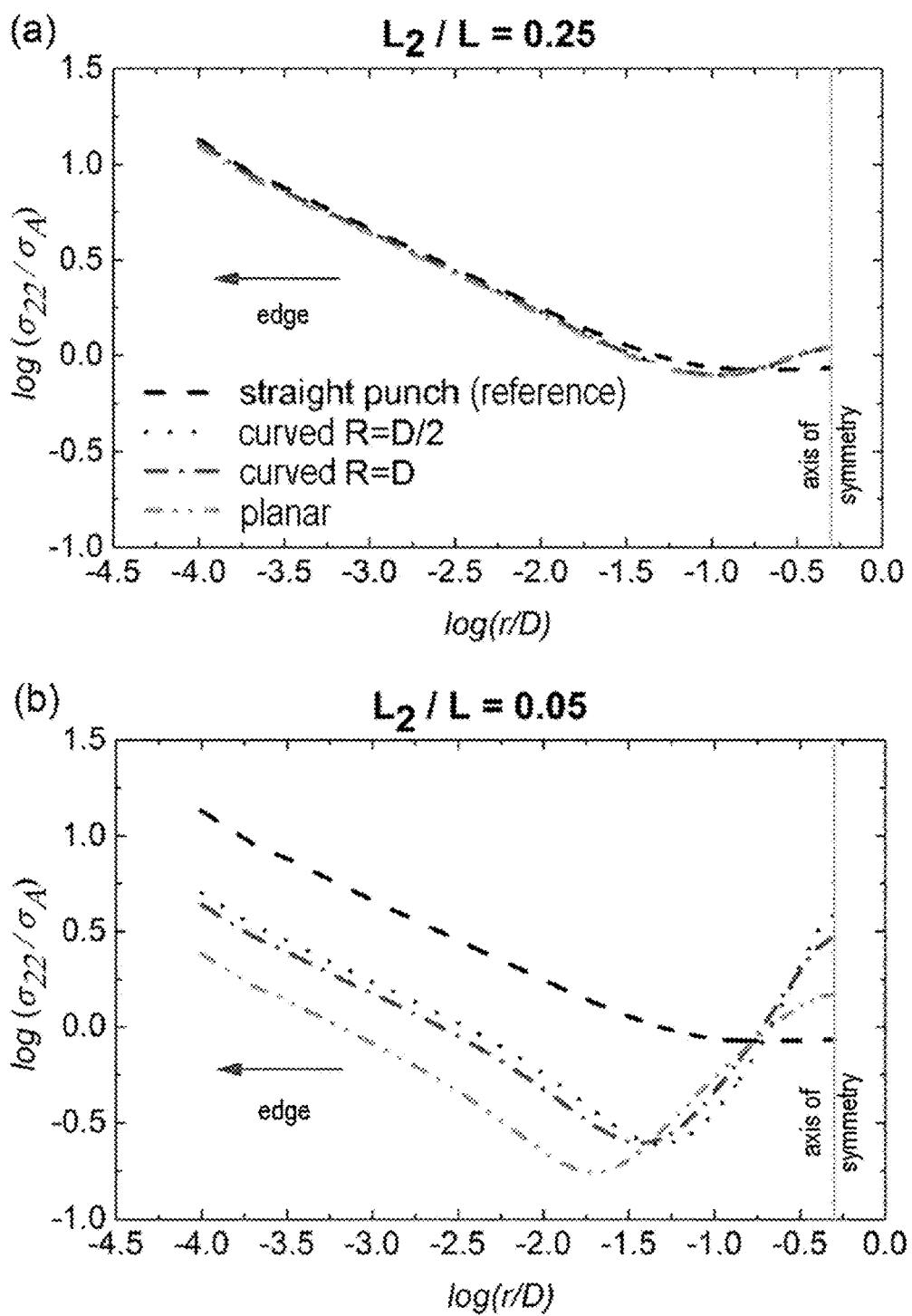
FIG. 7 Tensile stress $\sigma_{22}$ along the composite pillar/substrate contact area for composite pillars with different interface geometries, $E_1/E_2=1000$ and $L_2/L$ ratios of a) 0.25 and b) 0.05; the dashed line shows the reference sample ("straight punch")
Figure 8:
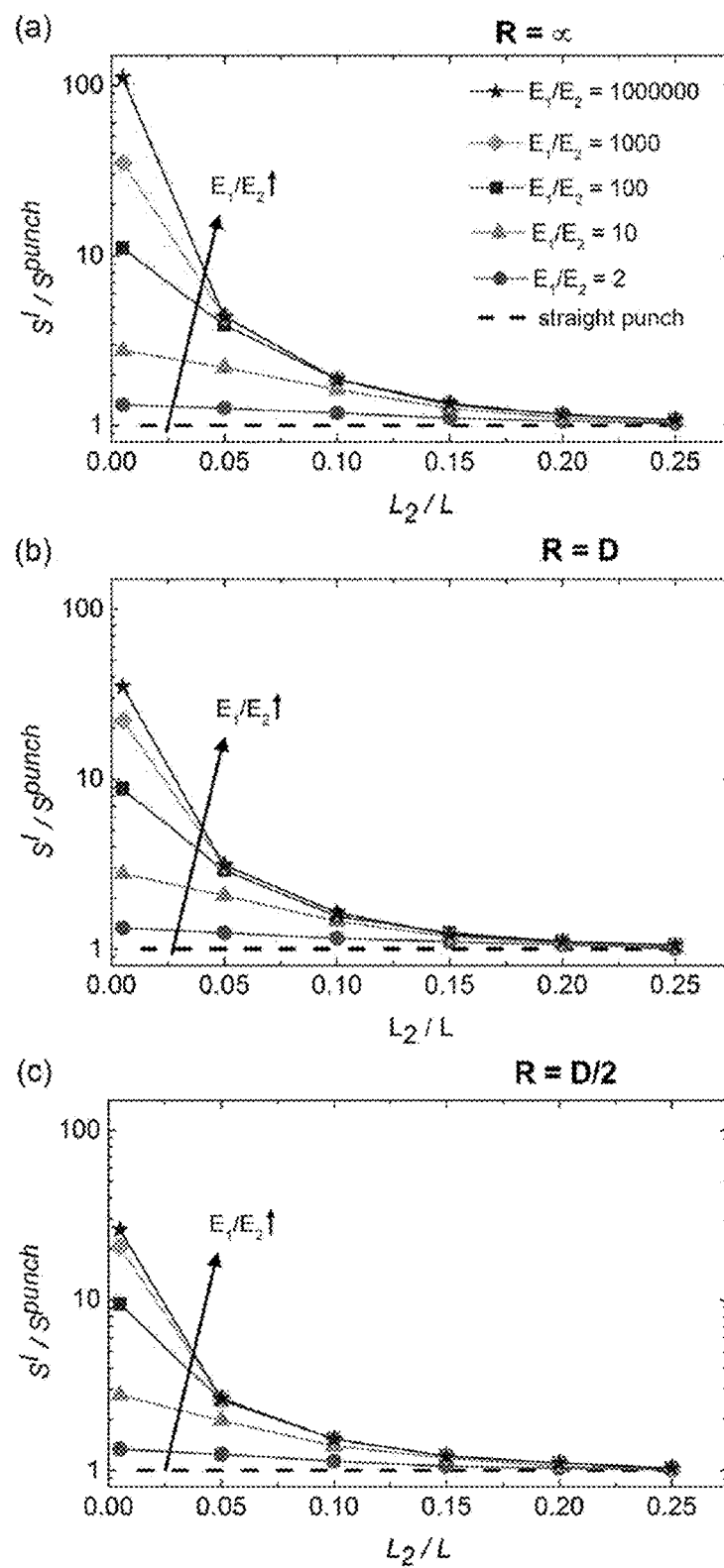
FIG. 8 Influence of the ratio of the elasticity moduli on the normalized adhesion strength of composite pillars with a) planar interface; curved with radius R equal to b) diameter D (R=D); c) half of the diameter D (R=D/2); the dashed line shows the reference sample; the different ratios of the elasticity moduli are $E_1/E_2=2$ (circles); $E_1/E_2=10$ (triangles); $E_1/E_2=100$ (squares); $E_1/E_2=1000$ (rhombi); $E_1/E_2=1000000$ (stars)

For composite pillars with a curved interface (R=D and R=D/2), FIG. 7 shows the results for a ratio $E_1/E_2=1000$ with $L_2/L=0.25$ and $L_2/L=0.05$. It is found that for a ratio of $L_2/L=0.25$ the influence of the phase boundary is scarcely detectable (FIG. 7 a)). For $L_2/L=0.05$, i.e. for a thinner tip, the geometry of the phase boundary very markedly influences the form and height of the stress distribution along the interface (FIG. 7 b)). If the radius of the spherically curved interface is increased, the stress in the center is increased. While the slope of all curves up to the edge is the same, they rise towards the center markedly differently. The stress at the edge is the lowest for the planar phase boundary, on account of which the larger adhesion stresses were determined for here in comparison to the curved phase boundaries.

The adhesion stress $S^I$ of the composite pillars can be calculated by means of equation 8 and normalized by means of equation 9 to the adhesion stress of the reference. The results for various composite pillars are shown in FIG. 9.

The stress distribution along the contact area is not directly experimentally accessible, however the adhesion stress can be calculated from the pull-off force divided by contact area. In order to supplement the simulations, the adhesion of the previously described projections (reference sample and composite pillars with planar and curved (R=D/2) phase boundary and in each case two ratios $E_1/E_2=2$, and 350 respectively), was studied.

Figure 9:
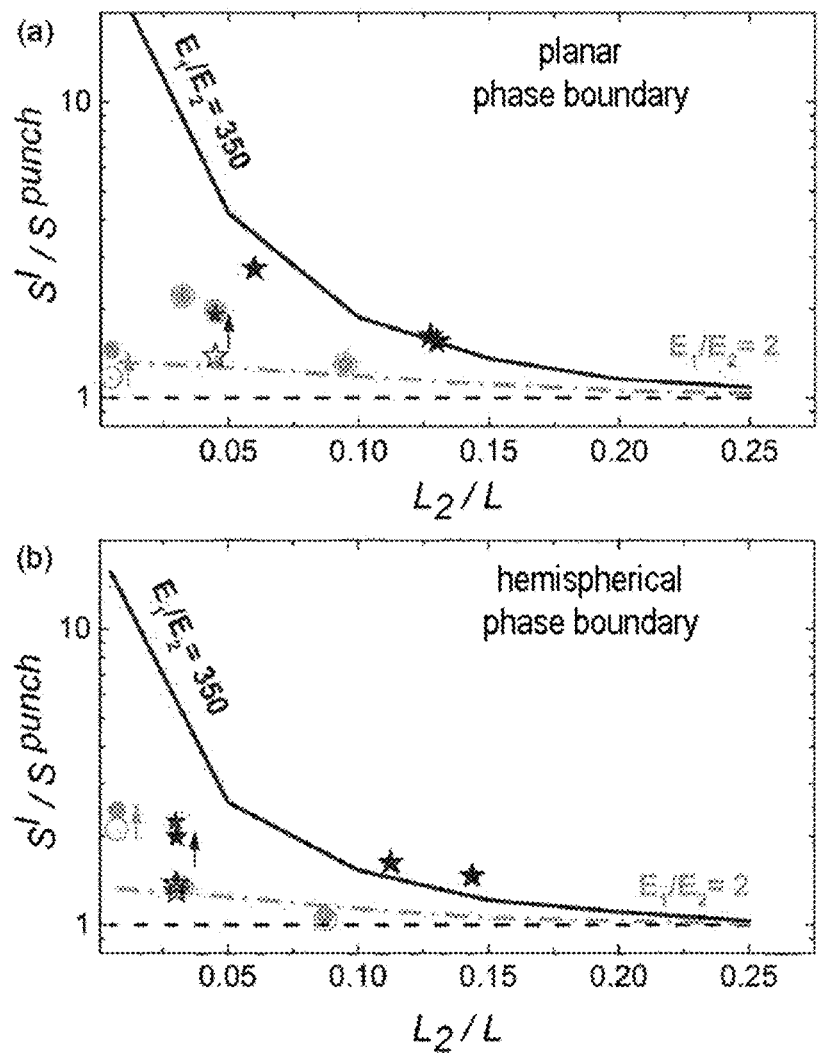
FIG. 9 Comparison of the adhesion strength ($S^I/S^{punch}$) of experimental and numerical results for composite pillars with a) planar interface and c) curved interface with elasticity modulus ratios $E_1/E_2=2$ and 350. The FEM results are represented with lines; reference sample (dashed); composite pillars with $E_1/E_2=2$ (dash-dot); composite pillars with $E_1/E_2=350$ (continuous line); the experimental results are designated with the symbols; $E_1/E_2=2$ (circles); $E_1/E_2=350$ (stars; wherein the filled and empty stars respectively represent the pull-off forces and the forces at the start of detachment); arrows indicate when the two forces markedly deviate from one another)
Figure 18:
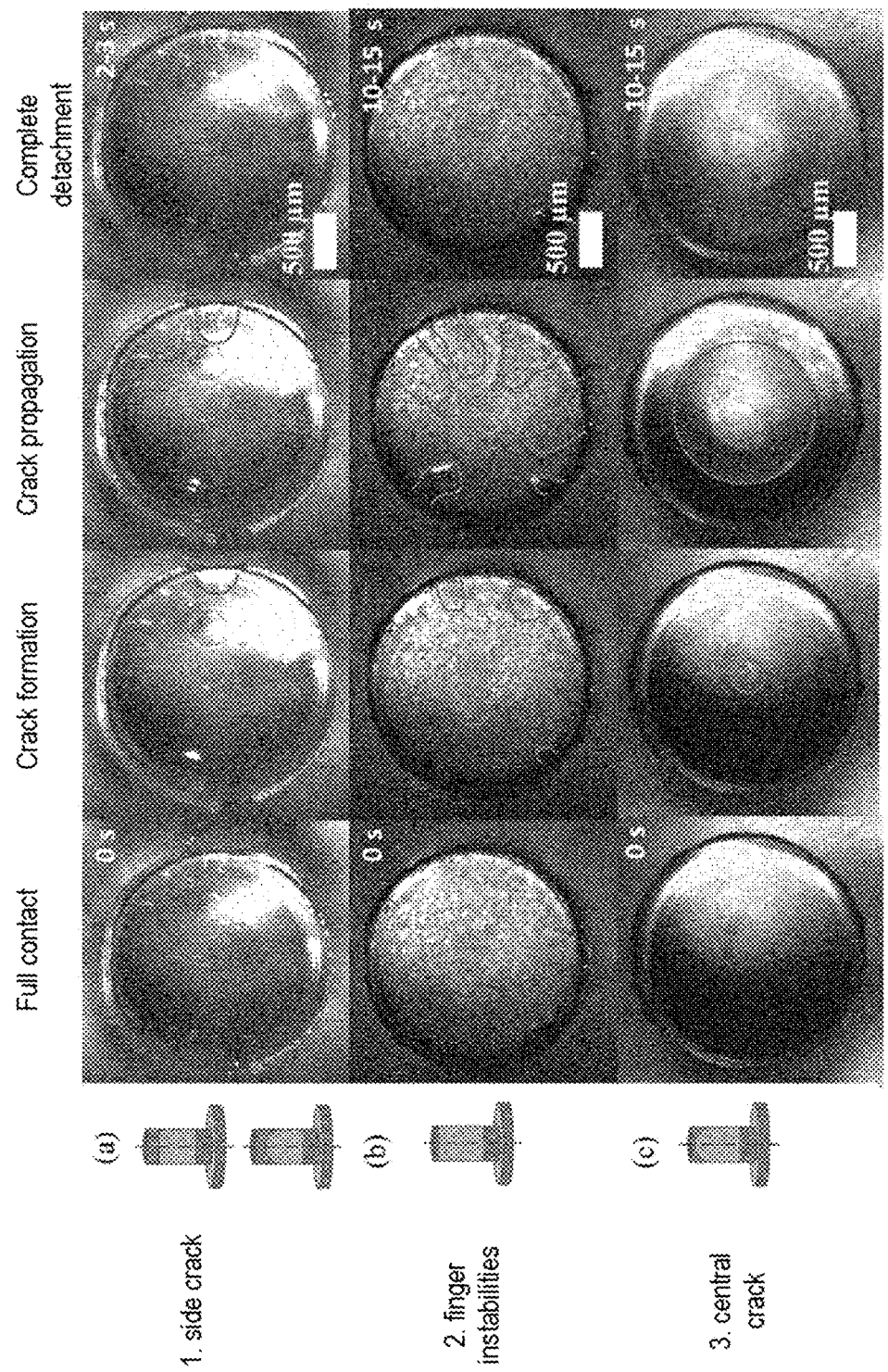
FIG. 18 Optical micrographs of detachment patterns (crack pattern), measured with speed 2 μm/s; a) projections with very thick soft tip; b) projections with curved interface and thin tip; c) projections with planar interface and thin tip.

These values are shown together with the calculations in FIG. 9. The pull-off forces of the composite pillars were as a rule greater than for the reference samples. For the two different geometries of the phase boundaries, the adhesion stress measured increased with decreasing $L_2/L$ ratio ($L_2/L>0.06$ for $E_1/E_2=350$ and $L_2/L>0.03$ for $E_1/E_2=2$). With these ratios, the adhesion of the composite pillars with planar phase boundary was higher than for composite pillars with hemispherically curved phase boundary. For these ratios, the detachment of the contact area always began at the edge and caused a rapid complete detachment (FIG. 18). Hence no differences could be detected in the force for the start of detachment and the force for complete detachment. For thinner tips with a smaller $L_2/L$ ratio, a different mechanism of detachment was observed, which depends in particular on the geometry of the interface. For planar interfaces (FIG. 18 c)) below a certain ratio, which depends on the ratio of the elasticity moduli, a decrease in the adhesion force was observed. In this case, instead of a single detachment at the edge, several detachments now form simultaneously at the edge, which propagate rapidly inwards like fingers. For composite pillars with curved interfaces and small $L_2/L$ ratio (FIG. 18 b)), a further mechanism of detachment was observed. Here, the detachment begins in the center of the contact area and increases only slowly, up to a critical diameter of about 0.6 D. Only then does complete detachment occur. Hence as shown by the arrows in FIG. 9 b), for these composite pillars higher pull-off forces could be observed in comparison to the forces necessary for the start of the detachment.

Irrespective of the mechanism, composite pillars show a steady increase in adhesion with decreasing $L_2/L$ ratio, unlike composite pillars with planar interface. The results show good agreement with the simulations, except with very thin tips, probably because the mathematical model used assumes start of the detachment at the edge.

Starting from the results, it can be assumed from these that a ratio of the elasticity moduli of over 1000 does not bring about any further increase in the adhesion. A decrease in the $L_2/L$ ratios as a rule leads to an increase in the adhesion, just like an increase in the ratio of the elasticity moduli ($E_1/E_2$).

Figure 10:
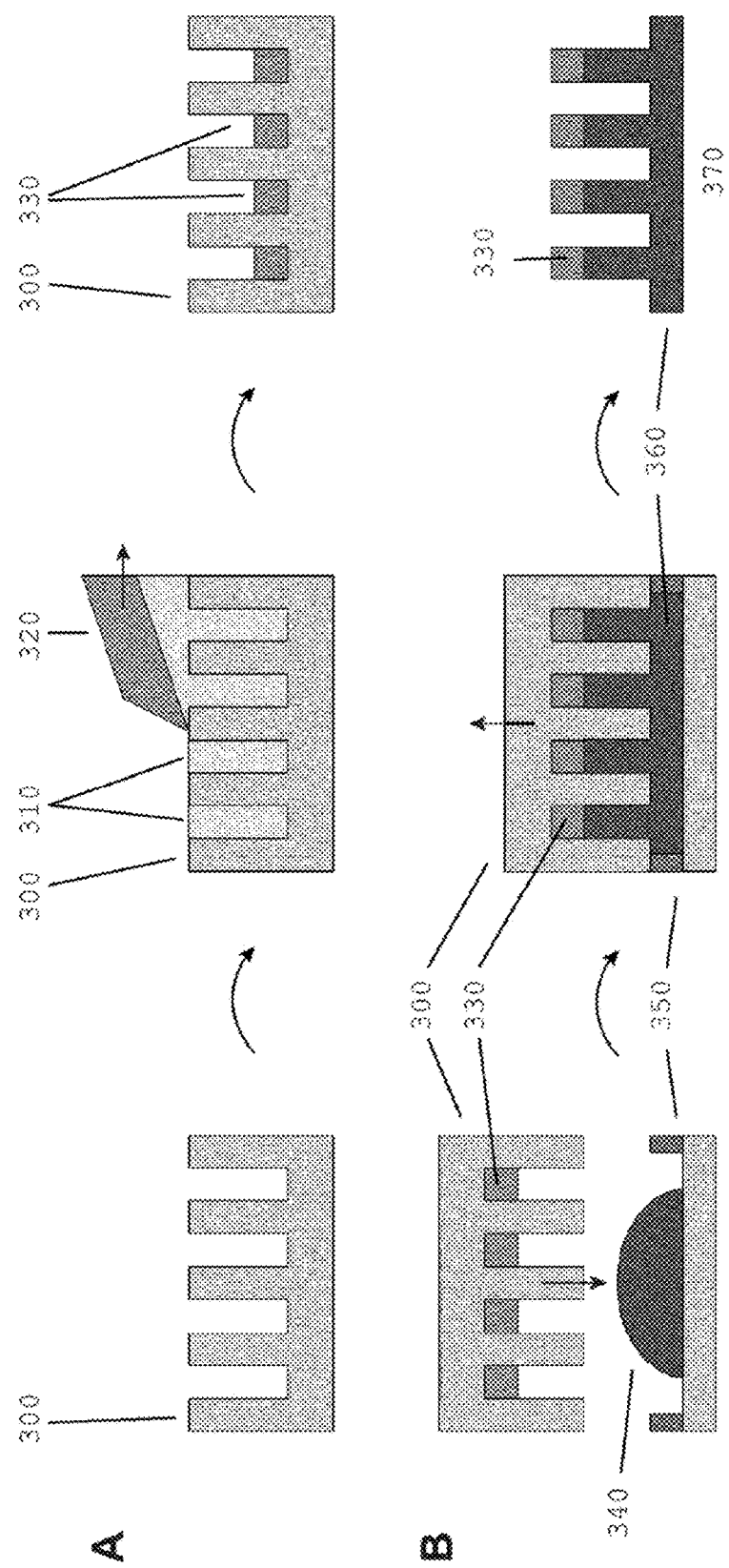
FIG. 10 Schematic representation of the production of a structured surface.

FIG. 10 shows a schematic representation of a method for the production of a structured surface according to the invention. The sequence A shows the production of a prepared template which contains a composition for the region for the end faces. The sequence B shows the fabrication of the structured surface.

Firstly a template 300 for molding the structured surface is provided. Preferably the template has an inertized, preferably fluorinated or perfluorinated surface. Thus this can for example consist of perfluorinated polyether (PFPE). The template can be obtained by molding corresponding silicon master structures.

A composition 310 comprising the material for the region with low elasticity modulus or composition comprising a precursor thereof is filled into the openings of the template. In order to fill a consistent volume, it can be advantageous to fill the openings completely and then strip off the excess composition with a stripper or a doctor blade 320. The composition preferably comprises at least one solvent, which is removed in a next step, preferably by evaporation, for example under vacuum. Since the composition is liquid, a meniscus forms, and thus a curvature of the surface of the composition in the opening of the template.

The composition can for example be a solution of monomers, such as precursors for silicones. It can also be a solution of a crosslinkable polyurethane, such as a polyurethane (meth)acrylate. As the solvent, volatile organic solvents are in particular possible, such as lower alcohols, ethers, esters or alkanes.

Optionally, the composition can also be further cured. Through the decrease in volume of the introduced composition due to removal of the solvent and/or curing, a dried/cured composition 330 is obtained on the floor of the openings in the template.

Depending on the composition used, the curing can take place by heating and/or irradiation.

The template thus treated serves only as a receptacle for the molding of the structured surface, wherein the composition already present in the receptacle binds with the other compositions for the other regions. For this, a composition 340 comprising the material for formation of the region with the higher elasticity modulus or a precursor thereof is applied onto a counterpart 350 to the template and then contacted with the template for the molding. After this, the composition is cured. This can also include the curing of the other regions. Several curing steps can also be performed. A cured composition with higher elasticity modulus is obtained. In the diagram, the backing layer, on which the projections are positioned, is also simultaneously formed by the same material. After removal from the template, a structured surface 370 according to the invention is obtained.

Figure 11:
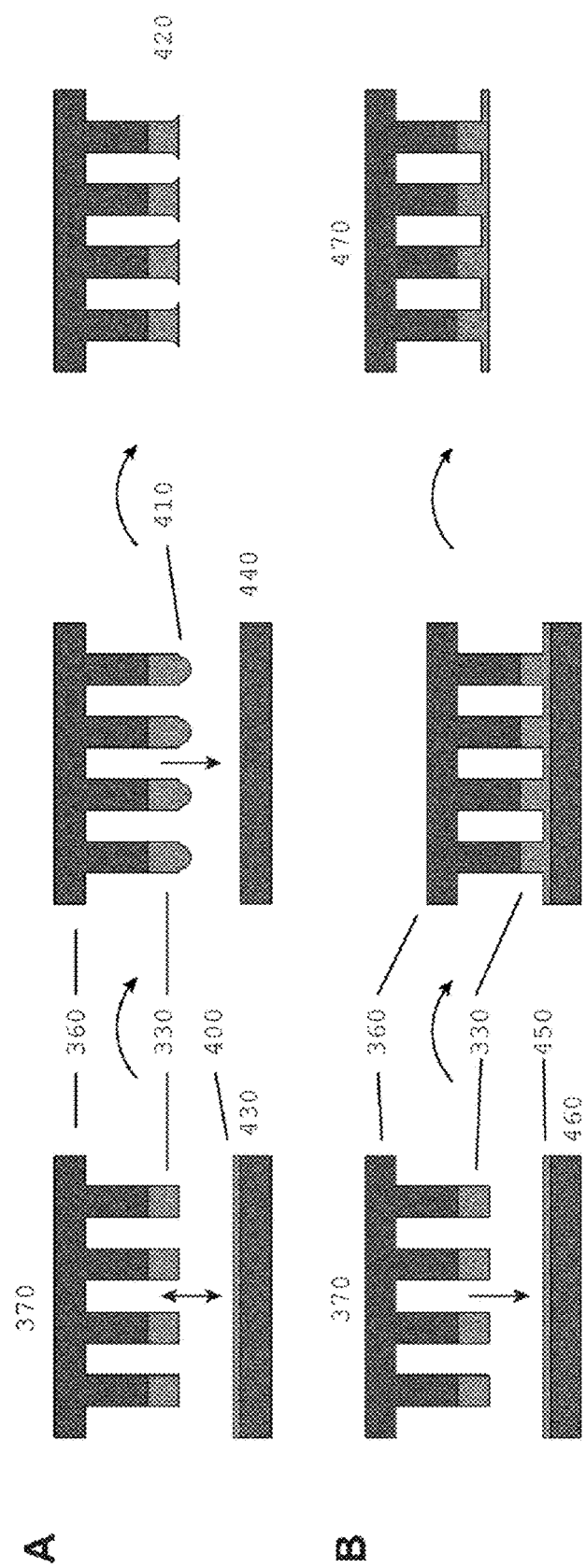
FIG. 11 Schematic representation of the production of embodiments of the invention.

FIG. 11 shows a method for the production of embodiments of the invention. In sequence A, the production of broadened end faces is shown. Sequence B shows the production of projections bridged by a film.

For the production of broadened end faces, a film of a composition of a material for the broadened end faces 400 is applied onto a surface 430. The end faces of the structured surface are dipped into this liquid film and lifted away again. As a result, drops 410 of the composition are formed on the surface of the end faces. For the production of the broadened end faces, these drops are pressed against a further surface 460. Thereby, a broadening of the drops takes place. The drops thus deformed are cured. A structured surface with broadened end faces 420 is obtained. According to the invention, the material for the broadened end faces has an equal or lower elasticity modulus than the material of the end faces.

For the production of bridged projections, a curable film 450 is applied onto a surface 460. The structured template 370 is dipped with the end faces into this film, and the film cured. As a result, formation of a film and bonding of the film with the structured surface take place. After detachment from the surface, a structured surface is obtained the projections whereof are bridged with a film.

Adhesion Measurements

The adhesion measurements were performed with an apparatus according to Kroner, E.; Blau, J.; Arzt E. An adhesion measurement setup for bioinspired fibrillar surfaces using flat probes. Review of Scientific Instruments 2012, 83. In this, the composite pillar sample was applied onto a glass substrate and mounted in a sample holder movable and tiltable with high precision. The forces were recorded with a 3 N load cell (Tedea-Huntleigh 1004, Vishay Precision Group, Basingstoke, UK). The load cell was equipped with a smooth, flat and aligned glass test body (substrate). Before each measurement, the substrate was cleaned with ethanol. With the aid of a prism, the contact of the sample with the surface was observed and the sample aligned. For the measurement, the sample was moved onto the substrate with a speed of 5 µm/s. FIG. 14 shows the usual course of the force measurement. After contact, a predefined (positive) preloading (preload stress) was set and this force maintained for a defined time (holding time). After this, the sample was moved away from the substrate again. During this, the (negative) pull-off stress was measured. The lowest stress measured is the adhesion stress. All measurements were monitored with an optical camera.

After the measurement, the samples were cut through lengthways and the thickness of the individual region measured with an optical microscope (precision +/−30 µm).

Figure 12:
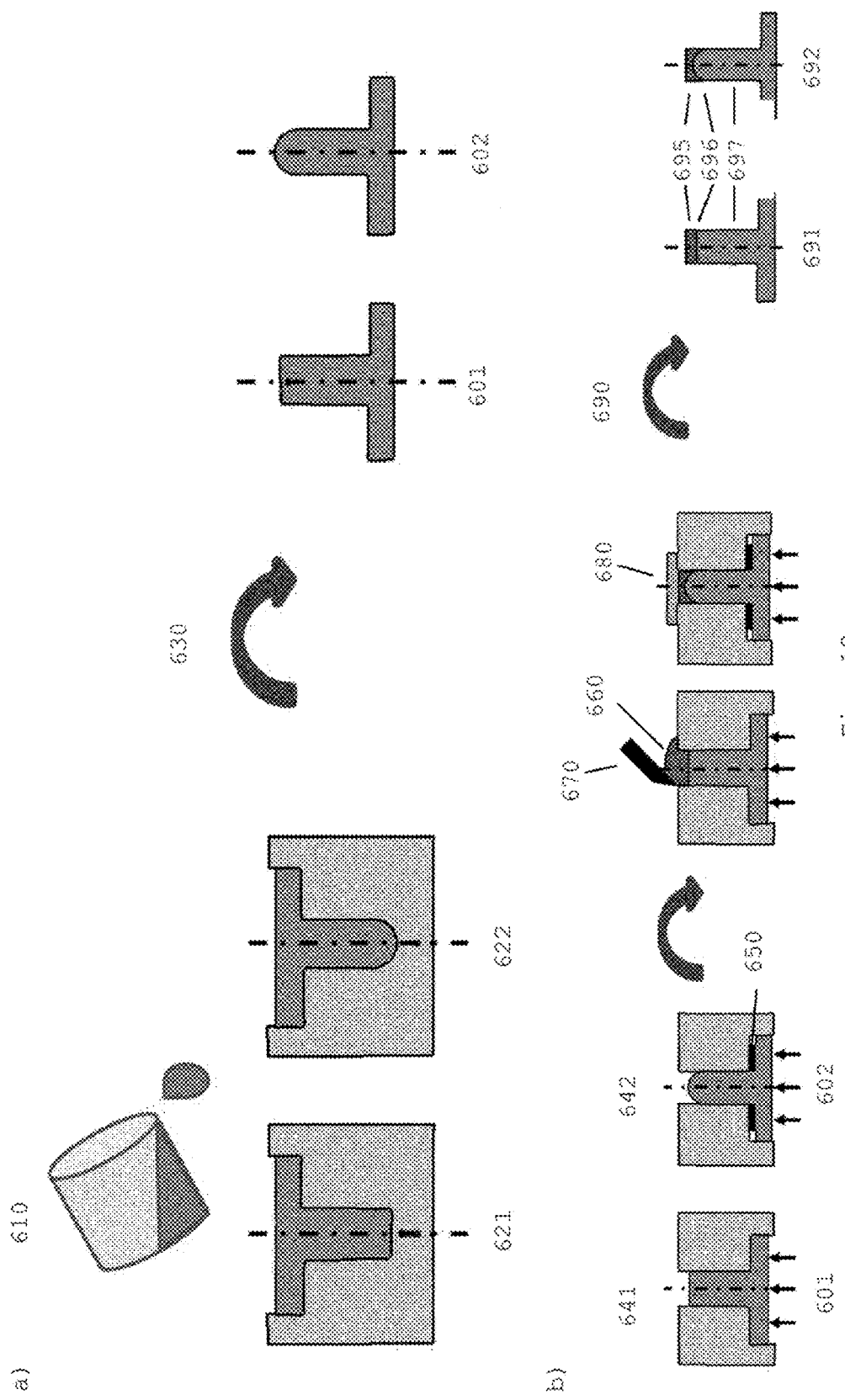
FIG. 12 Schematic representation of an alternative method for the production of projections according to the invention.

FIG. 12 shows the production of macroscopic projections (pillars). The diameter of all structures is 2 mm and the height about 4 mm, so that an aspect ratio of 2 is present. All projections have a circular cross-section. The axis of symmetry is indicated with the dashed line.

Firstly, the pillar stem was cast from PDMS (a). In the second step b), the tip is filled with another material. For the flat (601) and curved (602) pillars (radius 1 mm) corresponding molds (621, 622) of aluminum were made with a flat or round drill. (The molds were coated, in order to enable simpler removal of the structures from the cavities.) The molds were filled with the first prepolymer 610 (here PDMS Sylgard 184, E modulus ca. 2 MPa) and degassed. Then the excess polymer was scraped off with a razor blade in order to enable a flat back layer with constant thickness, before the samples were cross-linked at 100° C. on a hotplate for 30 mins (630).

In the next step b), the previously produced structures were activated for 2 mins in oxygen plasma in order to enable the chemical attachment of a second polymer layer. For the application of the soft, upper layer, aluminum molds with a through hole with high matching precision were used (641, 642). The flat or rounded PDMS stems could thus be pressed into the molds and secured from the back with a little pressure. Different thicknesses of the upper layer can be set with aluminum molds of different depth. In these preliminary experiments, washers (650, shown in black in the middle picture) were also used to set the thickness. The prepolymer 660 for the region with lower elasticity modulus was poured into the mold after mixing, and degassed for 1 min. Next the excess polymer was scraped off with a razor blade 670 and the structure covered with a Teflon substrate 680. A two-hour crosslinking 690 was effected at 75° C. before the finished pillars 691 and 692 could be carefully removed. The pillars/projections have a region with high elasticity modulus 697 and a region with lower elasticity modulus 695, which adjoin one another and have a corresponding phase boundary 696. This can, as in the case of projection 692, be curved. FIG. 13 shows photographs of the projections produced and the interfaces.

Figure 15:
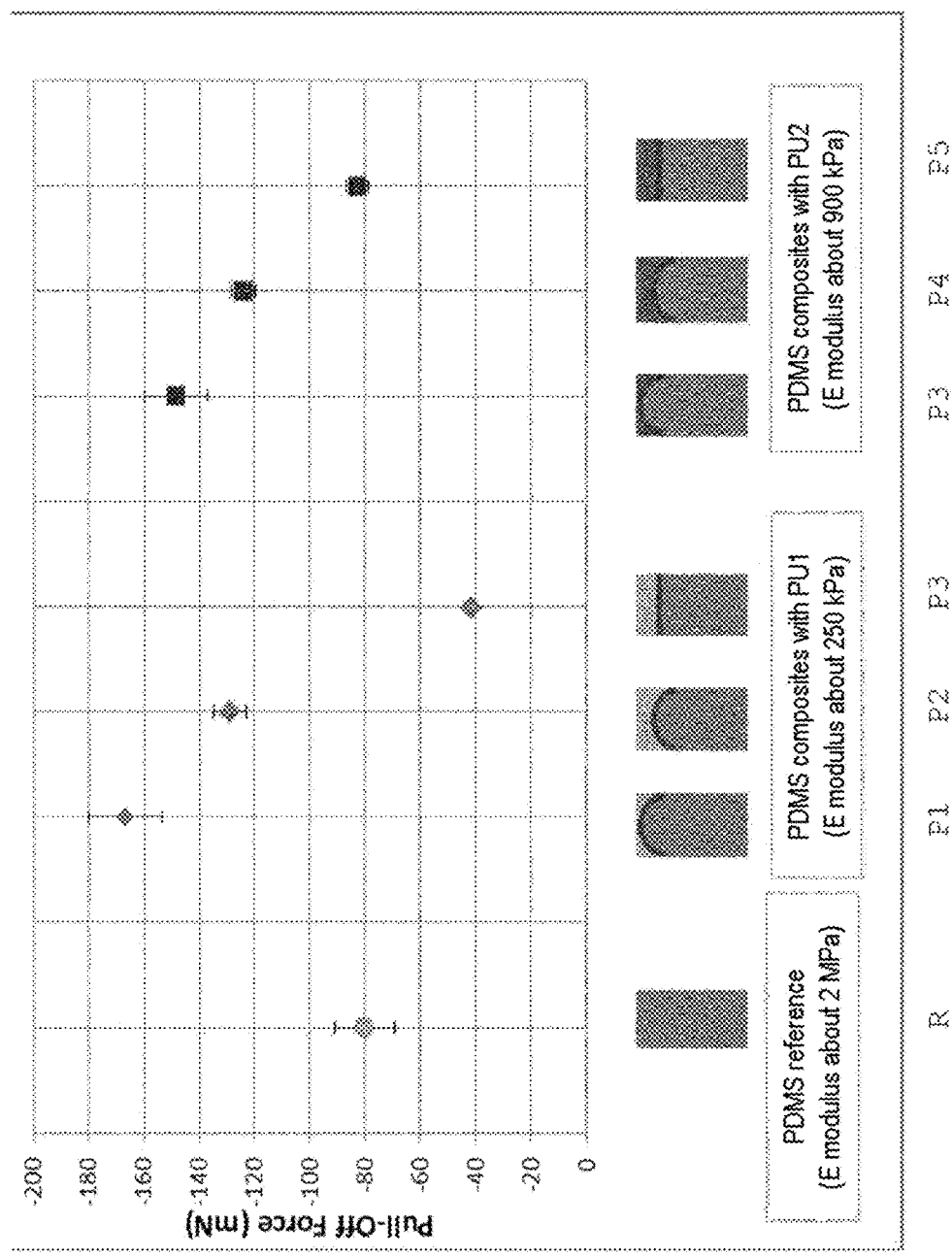
FIG. 15 Adhesion measurement of various projections against a flat glass substrate.

FIG. 15 shows the adhesion forces measured with the projections produced against a flat glass substrate. As the reference, a projection of pure PDMS was used. Projections with a region with lower elasticity modulus of 250 kPa (P1, P2, P3) and 900 kPa (P3, P4, P5) were produced. The region with the high elasticity modulus was always PDMS (2 MPa). As the material for the regions with the low elasticity modulus appropriate polyurethanes were used. The samples P3 and P5 have a phase boundary of the two regions parallel to the end face. The samples P1 and P2, and P3 and P4 respectively differ in the thickness of the regions with low elasticity modulus. It is found that the projections with lower thickness have improved adhesion. Apparently with these the positive effect of the curved phase boundary on the adhesion is stronger.

For samples with smooth or rough surface, a glass substrate with two regions was used, a region with low roughness ($R_a$=0.006 µm and $R_z$=0.041 µm) and a region with higher roughness ($R_a$=0.271 μm and $R_z$=2.174 μm). In the comparative measurements, these regions are designated respectively as smooth or rough surface. Before each measurement, the substrate was cleaned with ethanol.

For the samples for the measurements of FIGS. 9, and 17 to 19, the following materials were used:

Polyguss 74-41 (PU, PolyConForm GmbH, Duesseldorf, Germany) is a two-component polyurethane which is produced from two components A and B which are added in equal quantity. The prepolymer solution is mixed under vacuum for 2 minutes at 2000 rpm in a SpeedMixer (DAC600.2 VAC-P, Hauschild Engineering, Hamm, Germany). The polymer obtained has an elasticity modulus of about 900 kPa.

Polydimethylsiloxane (PDMS, Sylgard 184, Dow Corning, Midland, Mich., USA) was used in a mixing ratio of 10 parts (weight) base solution and 1 part crosslinker. The prepolymer solution was degassed under vacuum for 5 minutes at 2000 rpm in a SpeedMixer. The PDMS has an elasticity modulus of about 2 MPa.

Poly(ethylene glycol) dimethacrylate (PEGdma) with an average molecular weight of 200 g/mol (Sigma-Aldrich, St. Louis, Mo., USA) was mixed with the photoinitiator 2-hydroxy-2-methyl-propiophenone (Sigma-Aldrich, St. Louis, Mo., USA). To this was added 2-aminoethyl methacrylate hydrochloride (1 wt. %, Sigma-Aldrich, St. Louis, Mo., USA), in order to increase the bonding between PU and PEGdma. The polymer obtained has an elasticity modulus of about 350 MPa.

The microstructures were produced according to the method according to FIG. 12. In the first step, the stems of the composite pillars were produced in two prefabricated aluminum molds. The stems produced have a circular diameter of 2 mm, a height of 4 mm and a 1 mm thick base layer. The projections have either a flat end face or a spherically curved end face with a radius of 1 mm.

Depending on the second material of the projections, the production process was slightly varied. In the case of PDMS the prepolymer was filled into the mold, degassed for 10 minutes and cured at 125° C. for 20 minutes on a hotplate. PEG prepolymer was filled into the mold, treated with nitrogen for 20 minutes and then cured with UV light for 300 s (Omnicure S1500, Excelitas Technologies, Waltham, Mass., USA).

In the second step, the structures produced were introduced into an aluminum mold with cylindrical holes with a radius of 2 mm and a depth of 4 mm. In order to obtain different thicknesses of the second region, or of the tip, spacers with a thickness of 100 μm, 300 μm, and 500 μm respectively were inserted on the underside of the mold. These thus lie between the base layer and the aluminum mold. As a result, the upper region of the composite pillar lengthens correspondingly. The PU prepolymer was applied onto the projections in the mold and degassed for 2 minutes. After this, the projecting polymer was removed with a razor blade. A glass plate with a Teflon film was applied onto the top side of the mold. After this, the structures were cured at room temperature for at least 16 hours and the composite pillars removed from the mold.

For PDMS, before the second step the surface of the projections was activated for 2 minutes with oxygen plasma (60% power; PICO plasma system, Diener electronic, Ebhausen, Germany). This allows the covalent bonding of the PDMS with the PU of the stems.

For the measurements of FIGS. 9, and 17 to 19, the following analogous protocol was used. During the measurement, samples with the projections and substrate were moved onto one another until a maximal force, the preload (preload stress; preload force) was reached. This position (displacement) was maintained for a defined time (holding time). After this, the sample was moved away from the surface again, until the projections detach from the surface. For each sample, the preload was increased in about 5 steps from 40 to 180 mN. The measurement was moreover performed at two different regions of the sample (smooth and rough). The speed of the movement varied from 2 to 10 μm/s and the holding time varied from 0 to 120 seconds.

For the measurements on the smooth and rough surface, the adhesion stresses of the samples were determined for a preload of 50 and 150 mN, since the pull-off forces are connected with the preload.

In order to be able to compare the strain increase (strain rate) of different samples with the PU comparison sample, different speeds were compared, depending on the ratio of the elasticity moduli of the stem and the tip. For PDMS/PU composite pillars and also pure PU pillars, the experiments were performed at 10 μm/s, while for PEGdma/PU composite pillars 2 μm/s was selected. These speeds lead to a similar rise in the strain with time during the measurement.

From the recorded force/displacement data, the force for detachment of the sample (the pull-off force $F_{adh}$) was calculated. With use of the contact area of the projections A and the thickness of the tip $h_0$, the recorded diagram can be converted into a stress-strain curve by means of the following equation.

$$\varepsilon = \frac{d - d_0}{h_0} \quad (1)$$

and $$\sigma = \frac{F}{A}, \quad (2)$$

wherein ε is the elongation in the center of the soft region, d is the displacement, $d_0$ is the displacement on the relaxation curve at which the force is 0, and σ the stress in the middle. Since the material of the stem is much more rigid than the material of the tip, it is assumed for simplicity that the deformation of the projections takes place only in the softer tip. Apart from this, the maximal elongation $\varepsilon_{max}$ and the maximal stress $\sigma_{max}$ were calculated. Finally, from these data the adhesion energy was calculated:

$$W_{adh} = h_0 * \int_0^{\varepsilon_{max}} \sigma(\varepsilon) d\varepsilon. \quad (3)$$

An example of a measurement together with the analyzed parameters is shown in FIG. 14. The stress and elongation for complete detachment $\sigma_{max}$ and $\varepsilon_{max}$ and the area of the curve $W_{adh}$ were analyzed and compared between the samples.

Figure 16:
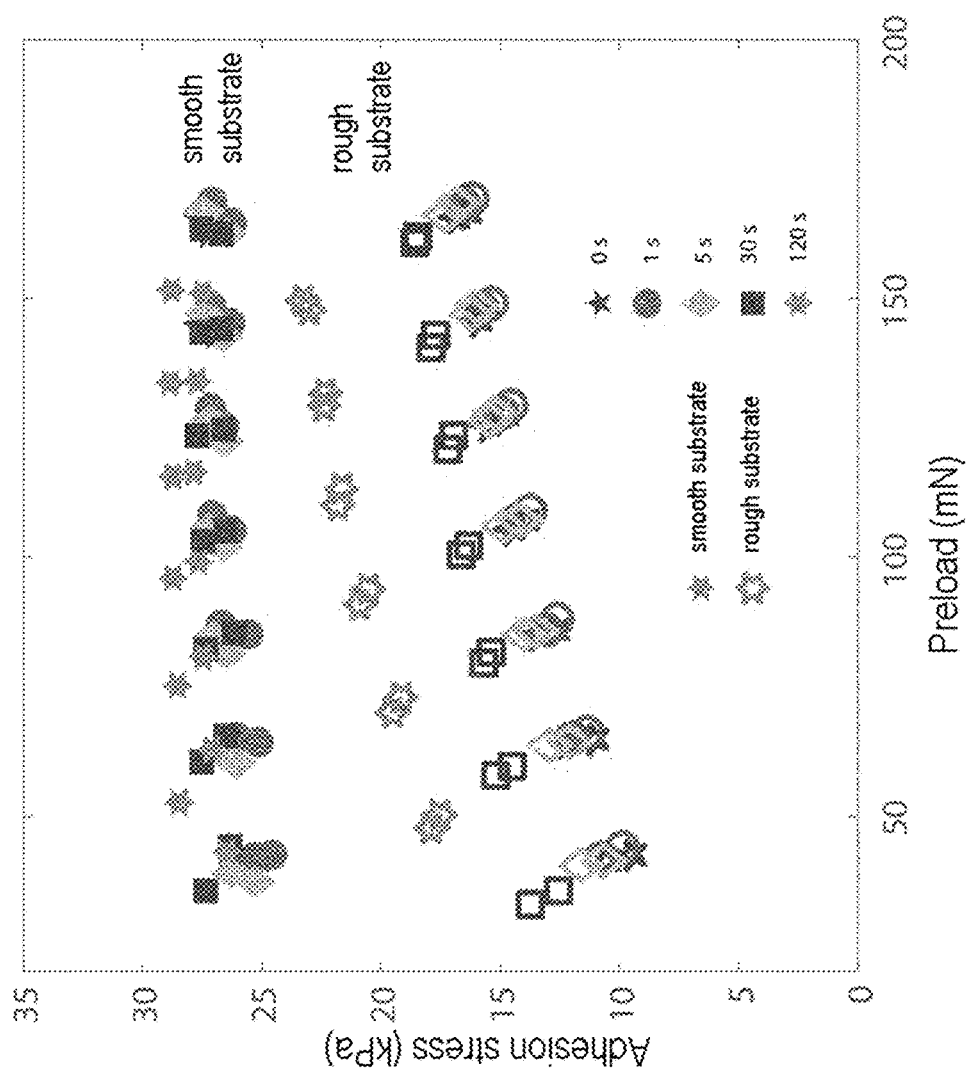
FIG. 16 Adhesion measurement of a reference sample with projections of polyurethane on smooth (filled symbols) and rough substrate (unfilled symbols); variation of the holding time from 0 to 120 s.

FIG. 16 shows measurements of a reference sample of polyurethane under different conditions (preload; roughness of the surface and holding time). The diagram shows the pull-off forces as a function of the preload under different measurement conditions. The PEGdma/PU and PDMS/PU composites have a ratio of the elasticity moduli of 350 and 2 respectively. The interface between the regions was either planar or curved (radius of curvature ca. 1 mm), while the thickness of the tip (the softer region) lay between 30 and 500 μm. Structures of pure PU were produced and used as reference. During the crosslinking, a slight decrease in the area occurred through shrinkage, with this being comparable for all samples. The influence of substrate, preload and holding time for PU comparison samples is shown in FIG.

16. The measurements were performed with a constant speed of 10 μm/s, with the holding time being varied between 0 and 120 s.

In general, the adhesion on smooth surfaces is higher and less dependent on the preload. On rough surfaces, there is a strong dependence on the preload. On smooth surfaces, the holding time has only a slight influence on the pull-off force. On rough surfaces, a longer holding time leads to higher pull-off forces.

Figure 17:
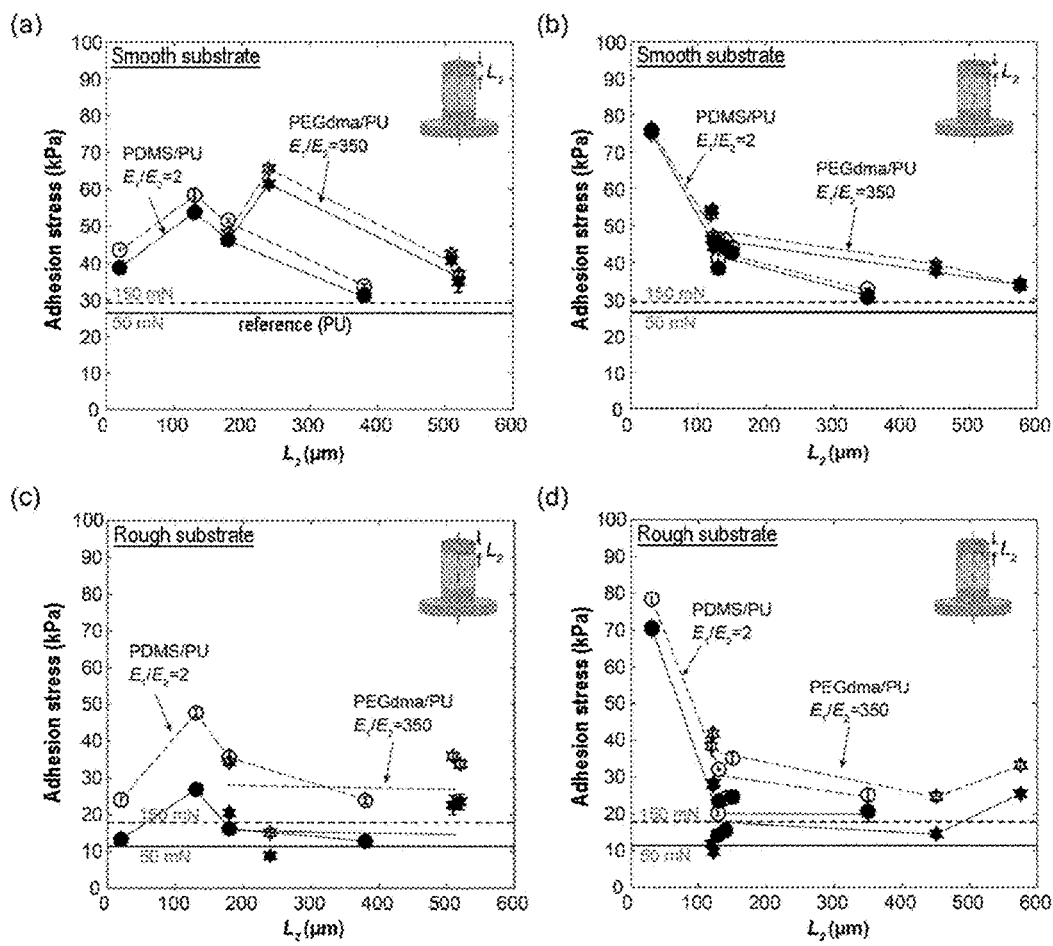
FIG. 17 Adhesion measurement with composite projections with varying thickness of the upper region $L_2$ and various geometries of the phase boundaries a) and c) planar; and b) and d) hemispherically curved; on a) and b) smooth substrate and c) and d) rough substrate; composite pillars with $E_1/E_2=2$ (circles; composite pillars with $E_1/E_2=350$ (stars); contact force 50 mN (continuous line) and 150 mN (dashed)

FIG. 17 shows adhesion measurements with composite projections with planar and curved interfaces with varying thickness of the upper region (tip). Various combinations of material for the tip and stem of the projections were studied: step of PDMS and tip of PU (PDMS/PU); stem of PEGdma with tip of PU (PEGdma/PU), and projections of pure PU as reference. All measurements were performed with 0 s holding time and a speed of 10 μm/s (PU reference and PDMS/PU), or 2 μm/s (PEGdma/PU) respectively. The horizontal lines show the average adhesion of the reference sample. The contact force varies in each case between 50 mN (solid line) and 150 mN (dashed line). Here a) and b) show the measurements on a smooth surface and c) and d) on a rough surface. It is found that for composite pillars with planar phase boundary, on a smooth surface the pull-off force rises to a maximum with increasingly thin tip and then falls again (FIG. 17 a)). On rough surfaces, the composite pillars with planar phase boundary show a marked improvement in the pull-off force as a function of the thickness of the upper region (FIG. 20 c)). For composite pillars with curved phase boundary, it is found that on a smooth surface the adhesion stress rises with increasingly thin tip (FIG. 17 b)). On rough surfaces, the composite pillars with curved phase boundary show a marked improvement in the pull-off force as a function of the thickness of the upper region (FIG. 20 d)). On rough surfaces, the adhesion stress is more strongly increased by increasing the preload than on smooth surfaces. Composite pillars with curved phase boundary exhibit a central first detachment ("center crack") with projections with a very thin upper region. On a smooth surface, the necessary pull-off force increases steadily with decreasing thickness of the upper region. A greater ratio of the two elasticity moduli also increases the necessary pull-off force. With the lowest thicknesses, a tripling of the pull-off force could be measured in comparison to the PU reference. On a rough surface, large layer thicknesses show a slightly improved adhesion. With decreasing thickness, the pull-off force increases. With the thinnest sample measured, a fivefold increase in the pull-off force could be measured. A smaller ratio of the elasticity moduli leads to better results.

FIG. 18 shows optical micrographs of detachment patterns (crack patterns), measured with a speed of 2 μm/s. The figures show the contact area of the end faces of the projections on the surface, and from left to right the development of the detachment of the projection from the surface. The detached regions are bordered with lines. Here the first image in each series in each case shows the end face with complete contact. The second image shows the start of detachment (crack initiation), which progresses in the third picture (crack propagation) up to complete detachment (full detachment) in the fourth picture. From the start of the series, in each case the structure of the projection is shown diagrammatically. The time statement gives the time to complete detachment. With projections with thicker upper region (tip) (shown in a)) with curved and planar interface a start of the detachment occurs at the edge of the contact area (edge crack). The detachment takes place on the scale of seconds with a low critical detachment area (critical crack size). In contrast to this, projections with curved interface and thin upper region (shown in b)) show a start of the detachment in the center of the contact area. Here it takes ca. 10 seconds to complete detachment.

With projections with planar interface and thin tip (shown in c)) the detachment starts with the formation of finger-shaped detached regions at several places simultaneously. There also the detachment takes ca. 10 seconds.

Overall, three different detachment mechanisms could be observed. Irrespective of the shape of the interface, projections with a thicker upper region or PU reference samples show the start of the detachment at the edge of the contact area (edge crack). Here a detachment forms at the edge of the contact area, and grows in the direction of the center and then leads to spontaneous complete detachment. For projections with a thinner upper region, the mechanism depends on the geometry of the interface. With a curved interface, detachment firstly occurs in the middle of the contact area. The circular detachment forms spontaneously and then with increasing elongation grows slowly in the direction of the edge. At a critical size of the detachment, sudden detachment then occurs. The detached area can be greater than the area still in contact, before the detachment occurs. In contrast to this, with projections with a flat interface geometry and low thickness of the tip, simultaneous formation of several finger-shaped detached areas occurs, which expand radially inwards before complete detachment occurs.

Figure 19:
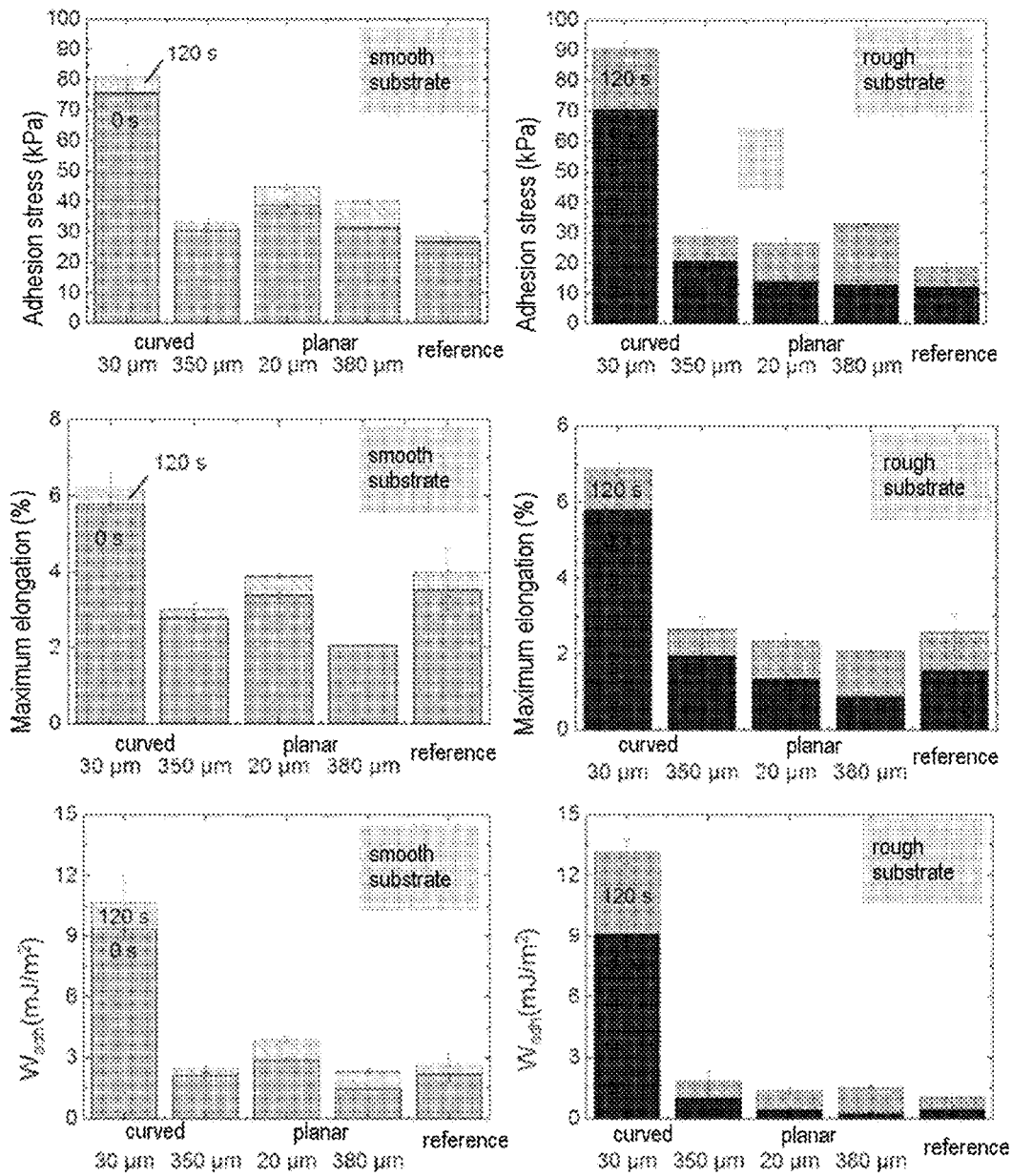
FIG. 19 Normalized adhesion parameters for composite projections with $E_1/E_2=2$ in comparison with PU reference on smooth (on left) and rough (on right) surface; (a) adhesion stress ($\sigma_{adh}$); (b) maximum stress $\varepsilon_{max}$ and (c) adhesion energy $W_{adh}$; the values were determined for a contact time of 0 and 120 s.

FIG. 19 shows characteristic parameters, such as the adhesion stress, $\sigma_{max}$, the maximal elongation of the projections until detachment, $\varepsilon_{max}$, and the adhesion energy, $W_{adh}$, for the description of the adhesion behavior of composite pillars with thick and thin tip and planar and curved phase boundary in comparison to the PU reference on smooth and rough surface. The values were determined for 0 and 120 s holding time. It is found that projections according to the invention above all with thin tips are markedly better than the PU reference for all parameters. In particular, the adhesion on rough surfaces and smooth surfaces is comparable. As is already clear from the measurements shown above, the adhesion energy $W_{adh}$ and also the adhesion stress $\sigma_{max}$ of the samples are much higher than for PU reference samples on both substrates. Moreover, the adhesion stress is comparably high on both substrates, while it decreases by about half for PU reference samples (FIG. 19 top). The trend is also similar for the adhesion energy. The composite pillar is markedly better than the PU reference and the adhesion energy is even somewhat higher on a rough surface than on a smooth surface (FIG. 19 middle). The maximal elongation $\varepsilon_{max}$ is also markedly higher on both substrates. This shows that the composite pillars exhibit good bonding onto the surface and are markedly more strongly deformable before detachment occurs, although the effective elasticity modulus is much higher owing to the markedly more rigid stem of the projections.

REFERENCE SYMBOLS

100 Projection
120 End face
130 Region with lower elasticity modulus
140 Phase boundary
150 Region with higher elasticity modulus
160 Surface/backing layer/back layer
170 Surface for the adhesion
300 Template for the structured surface
310 Composition for region with lower elasticity modulus
320 Stripper/doctor blade 330 Dried/cured composition
340 Composition for region with higher elasticity modulus
350 Counterpart to the template
360 Cured composition
370 Structured surface
400 Film of a composition for the broadened end faces
410 Drops
420 Structured surface with broadened end faces
430 Surface
440 Surface
450 Curable film
460 Surface
470 Structured surface with projections bridged by a film
500 Projection
502 End face
504 Base face
506 Overlap region
601 Projection with flat end face
602 Projection with curved end face
610 Crosslinkable composition
621 Mold for projection with flat end face
622 Mold for projection with curved end face
630 Crosslinking
641 Mold with through hole
642 Mold with through hole
650 Washer (thickness ca. 500 µm)
660 Crosslinkable composition
670 Razor blade/doctor knife
680 Teflon substrate
690 Crosslinking
691 Projection with two regions and planar phase boundary
692 Projection with two regions and curved phase boundary
695 Region with low elasticity modulus
696 Phase boundary
697 Region with high elasticity modulus

LITERATURE CITED

Bae, W. G., Kim, D., Kwak, M. K., Ha, L., Kang, S. M. & Suh, K. Y. (2013a). Enhanced skin adhesive patch with modulus-tunable composite micropillars. Adv. Healthc. Mater., 2, 109-113

Kroner, E.; Blau, J.; Arzt E. An adhesion measurement setup for bioinspired fibrillar surfaces using flat probes. Review of Scientific Instruments 2012, 83

Akisanya, A. R., Fleck, N. A., 1997. Interfacial cracking from the free edge of a long bi-material strip. International Journal of Solids and Structures 34, 1645-1665

Khaderi, S. N., Fleck, N. A., Arzt, E., McMeeking, R. M., 2015. Detachment of an adhered micropillar from a dissimilar substrate. Journal of the Mechanics and Physics of Solids 75, 159-183

The invention claimed is:

1. A structured surface of a solid body, wherein the surface has a structuring which comprises a plurality of projections which each projection having at least one stem with an end face pointing away from the surface,
   wherein the at least one stem in the longitudinal direction comprises at least two regions with different elasticity modulus, wherein at least two of the regions adjoin one another and form a phase boundary, and
   wherein the plurality of projections each comprise epoxy and/or silicone-based elastomers, polyurethane (meth) acrylates, polyurethanes, silicones, silicone resins, rubber, or mixtures thereof.

2. The structured surface as claimed in claim 1, wherein the phase boundary is not parallel to the end face of the respective projection.

3. The structured surface as claimed in claim 1, wherein the phase boundary has a curvature.

4. The structured surface as claimed in claim 1, wherein the projections have an aspect ratio of at least 3.

5. The structured surface as claimed in claim 1, wherein the projections are connected by a film.

6. The structured surface as claimed in claim 1, wherein the projections have broadened end faces.

7. A method for the production of a structured surface of a solid body as claimed in claim 1, comprising the following steps:
   a) providing a template for the structured surface;
   b) producing a composition comprising the material for the end faces;
   c) introducing the composition into the template;
   d) optionally completely or partially curing the composition;
   e) introducing another composition for further regions of the stems and for a backing layer into the template;
   f) curing the last composition introduced and/or all previously-introduced compositions; and
   g) detaching the structured surface from the template.

8. A combination of two bodies, wherein the interface has a structured surface as claimed in claim 1.

9. The structured surface as claimed in claim 1, wherein the at least two regions comprise a first region with a first elasticity modulus and a second region having a second elasticity modulus higher than the first elasticity modulus.

10. The structured surface as claimed in claim 1, wherein the at least two regions comprise a first region and a second region that is greater in size than the first region.

11. The structured surface as claimed in claim 1, wherein for each projection a ratio of a minimum vertical thickness of a region comprising the end face relative to a height of the projection is less than 0.5.

12. The structured surface as claimed in claim 1, wherein for each projection a volume of a region comprising the end face comprises 2% to 40% of the volume of the projection.

13. The structured surface as claimed in claim 1, wherein the at least two regions comprise a first region comprising polydimethylsiloxane and a second region comprising polyurethane.

14. The structured surface as claimed in claim 3, wherein the curvature is convex in a direction of the end face.

15. A solid body having a structured surface, comprising:
   a solid body with a surface having a structuring comprising a number of projections, each projection comprising at least one stem with an end face pointing away from the surface,
   wherein the at least one stem in the longitudinal direction comprises at least two regions with different elasticity modulus, wherein at least two of the regions adjoin one another and form a phase boundary, and
   wherein the number of projections each comprise epoxy and/or silicone-based elastomers, polyurethane (meth) acrylates, polyurethanes, silicones, silicone resins, rubber, or mixtures thereof.

16. A method for producing a solid body according to claim 15, comprising:
- providing a template for a structured surface;
- producing a composition comprising a material for the end faces;
- introducing the composition into the template;
- optionally completely or partially curing the composition;
- introducing another composition for further regions of the stems and for a backing layer into the template;
- curing the last composition introduced and/or all previously-introduced compositions; and
- detaching the structured surface from the template.

* * * * *